(12) United States Patent
Maruyama et al.

(10) Patent No.: US 12,315,129 B2
(45) Date of Patent: May 27, 2025

(54) MEASUREMENT METHOD AND MEASUREMENT DEVICE

(71) Applicant: Panasonic Intellectual Property Management Co., Ltd., Osaka (JP)

(72) Inventors: Yuki Maruyama, Osaka (JP); Taro Imagawa, Osaka (JP); Hiroya Kusaka, Hyogo (JP); Akihiro Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 370 days.

(21) Appl. No.: 17/881,836

(22) Filed: Aug. 5, 2022

(65) Prior Publication Data

US 2022/0375066 A1 Nov. 24, 2022

Related U.S. Application Data

(63) Continuation of application No. PCT/JP2020/044120, filed on Nov. 26, 2020.

(30) Foreign Application Priority Data

Feb. 18, 2020 (JP) ................................ 2020-025141

(51) Int. Cl.
*G06T 7/00* (2017.01)
*G06T 3/60* (2024.01)
(Continued)

(52) U.S. Cl.
CPC .............. *G06T 7/0004* (2013.01); *G06T 3/60* (2013.01); *G06T 7/13* (2017.01); *G06T 7/20* (2013.01);
(Continued)

(58) Field of Classification Search
CPC ........... G06T 7/0004; G06T 7/13; G06T 3/60; G06T 7/20; G06T 2207/30108; G06V 10/22; G06V 2201/07; G01M 5/0058
See application file for complete search history.

(56) References Cited

U.S. PATENT DOCUMENTS 5,327,528 A * 7/1994 Hidaka ............... G06F 3/04842
715/858
2014/0072241 A1 3/2014 Matsuoka
2017/0243366 A1 8/2017 Imagawa

FOREIGN PATENT DOCUMENTS

JP 2009-223723 10/2009
JP 2009-225211 10/2009
(Continued)

OTHER PUBLICATIONS

Facciolo, Gabriele, Nicolas Limare, and Enric Meinhardt-Llopis. "Integral images for block matching." Image Processing on Line 4 (2014): 344-369. (Year: 2014).*

(Continued)

*Primary Examiner* — Oneal R Mistry
*Assistant Examiner* — Nhut Huy Pham
(74) *Attorney, Agent, or Firm* — Wenderoth, Lind & Ponack, L.L.P.

(57) ABSTRACT

A measurement method, which is performed by a measurement device that measures a displacement of a target object, includes: receiving designation of a designation point on a first image that includes the target object; setting a plurality of set points, based on the designation point; identifying a direction of a line that connects two of the plurality of set points; generating a second image by rotating the first image, the second image being an image in which the identified direction of the line is horizontal or vertical; setting, in the second image, a measurement region that partially includes the line; and measuring the displacement of the target object (Continued)

in the measurement region, the displacement being a displacement in a direction orthogonal to the line.

17 Claims, 18 Drawing Sheets

(51) Int. Cl.
- G06T 7/13 (2017.01)
- G06T 7/20 (2017.01)
- G06V 10/22 (2022.01)
- G01M 5/00 (2006.01)

(52) U.S. Cl.
CPC ........... *G06V 10/22* (2022.01); *G01M 5/0058* (2013.01); *G06T 2207/30108* (2013.01); *G06V 2201/07* (2022.01)

(56) References Cited

FOREIGN PATENT DOCUMENTS

| JP | 2014-56379 | | 3/2014 |
|----|------------|---|--------|
| JP | 2015163860 A | * | 9/2015 |
| JP | 2018-138930 | | 9/2018 |

OTHER PUBLICATIONS

Kim, Sung-Wan, et al. "Vision-based monitoring system for evaluating cable tensile forces on a cable-stayed bridge." Structural Health Monitoring 12.5-6 (2013): 440-456. (Year: 2013).*

Sardesai, M. V., and A. K. Desai. "Investigation into Cable-Structure Interaction for Extradosed Bridge." International Journal of Engineering Research and Applications 3 (2013): 1424-1429. (Year: 2013).*

Kim, Sung-Wan, et al. "Vision-based monitoring system for evaluating cable tensile forces on a cable-stayed bridge." Structural Health Monitoring (2013) (Year: 2013).*

Sardesai, M. V et al. "Investigation into Cable-Structure Interaction for Extradosed Bridge." International Journal of Engineering Research and Applications 3 (2013) (Year: 2013).*

Xu, Yan et al. "A non-contact vision-based system for multipoint displacement monitoring in a cable-stayed footbridge." Structural Control and Health Monitoring (2018) (Year: 2018).*

International Search Report issued Jan. 12, 2021 in International (PCT) Application No. PCT/JP2020/044120.

* cited by examiner

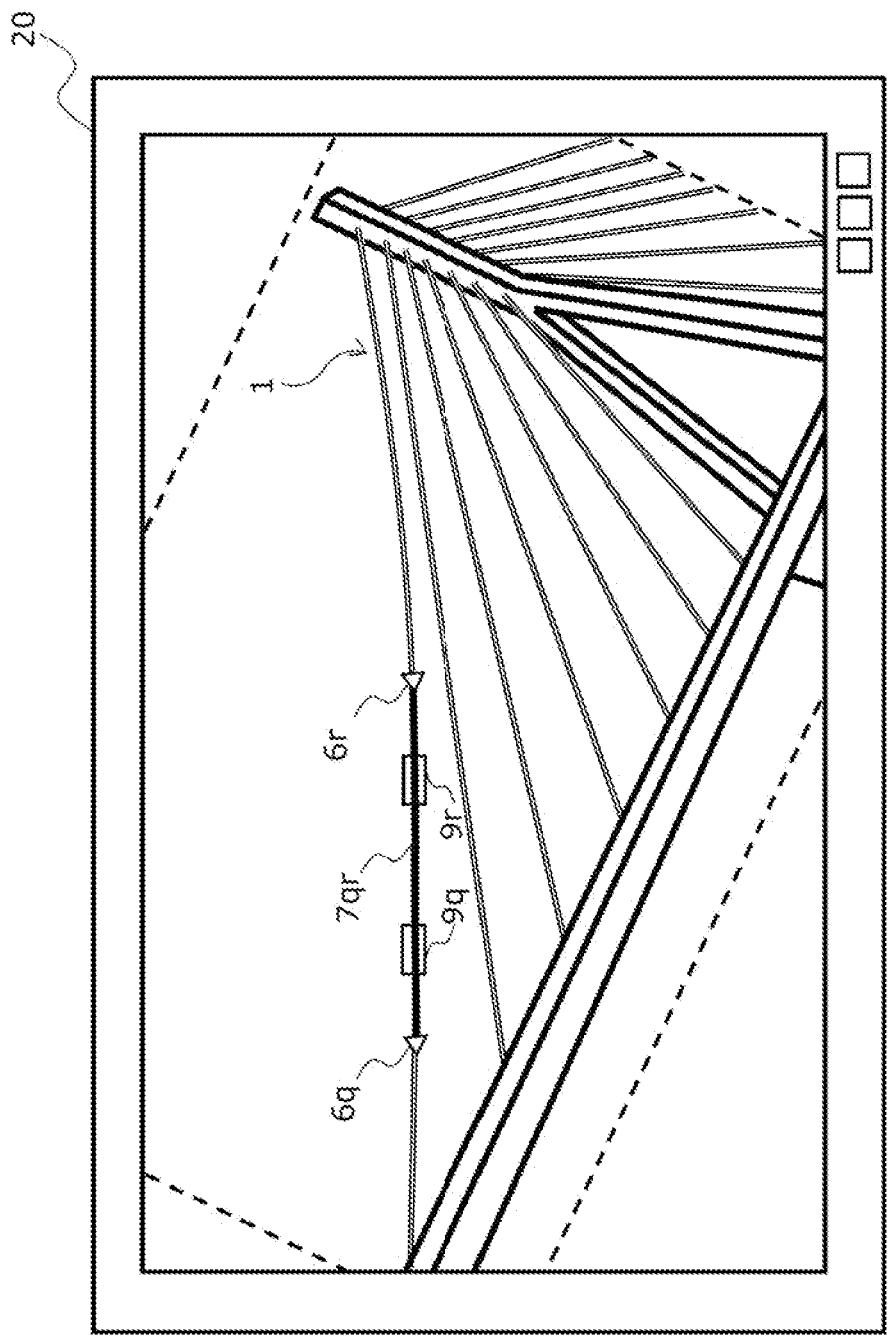

MEASUREMENT METHOD AND MEASUREMENT DEVICE

CROSS REFERENCE TO RELATED APPLICATIONS

This is a continuation application of PCT International Application No. PCT/JP2020/044120 filed on Nov. 26, 2020, designating the United States of America, which is based on and claims priority of Japanese Patent Application No. 2020-025141 filed on Feb. 18, 2020. The entire disclosures of the above-identified applications, including the specifications, drawings and claims are incorporated herein by reference in their entirety.

FIELD

The present disclosure relates to a measurement method and a measurement device for measuring a displacement of a target object.

BACKGROUND

Patent Literature (PTL) 1 discloses using block matching to analyze a moving image of a target object taken by an imaging device such as a camera and detecting a displacement of the target object from the result of the analysis.

CITATION LIST

Patent Literature

PTL 1: Japanese Unexamined Patent Application Publication No. 2018-138930

SUMMARY

Technical Problem

The present disclosure provides a measurement method and a measurement device capable of measuring a displacement of a target object in an easy and simple manner.

Solution to Problem

The measurement method according to an aspect of the present disclosure is a measurement method performed by a measurement device that measures a displacement of a target object. Such measurement method includes: obtaining a first image that includes the target object; causing a display to display the first image; receiving designation of a designation point on the first image; setting a plurality of set points on the target object, based on the designation point; identifying a direction of a line that connects two of the plurality of set points; generating a second image by rotating the first image, the second image being an image in which the direction of the line is horizontal or vertical; setting, in the second image, a measurement region that partially includes the line; and measuring a displacement of the target object in the measurement region, the displacement being a displacement in a direction orthogonal to the line.

The measurement method according to another aspect of the present disclosure is a measurement method performed by a measurement device that measures a displacement of a target object. Such measurement method includes: obtaining a first image that includes the target object, the first image having a horizontal direction and a vertical direction; causing a display to display the first image; receiving designation of a designation point on the first image; identifying a direction of the target object on the first image, based on the designation point; generating a second image by rotating the first image to cause the direction to be aligned with a first direction that is approximately aligned with the horizontal direction or the vertical direction of the first image; setting a measurement region, in the second image, that partially includes the target object; and measuring a displacement of the target object in the measurement region, the displacement being a displacement in a second direction that is orthogonal to the first direction.

The measurement device according to an aspect of the present disclosure includes: an obtainer that obtains a first image that includes a target object; an outputter that outputs the first image; a receiver that receives designation of a designation point on the first image; a first setter that sets a plurality of set points on the target object, based on the designation point; a generator that identifies a direction of a line that connects two of the plurality of set points and generates a second image by rotating the first image, the second image being an image in which the direction is horizontal or vertical; a second setter that sets a measurement region, in the second image, that partially includes the line; and a measurer that measures a displacement of the target object in the measurement region, the displacement being a displacement in a direction that is orthogonal to the line.

Advantageous Effects

The measurement method and the measurement device according to the present disclosure are capable of measuring a displacement of a target object in an easy and simple manner.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 12 is a diagram showing example measurement regions that are set by a second setter.

Figure 1:
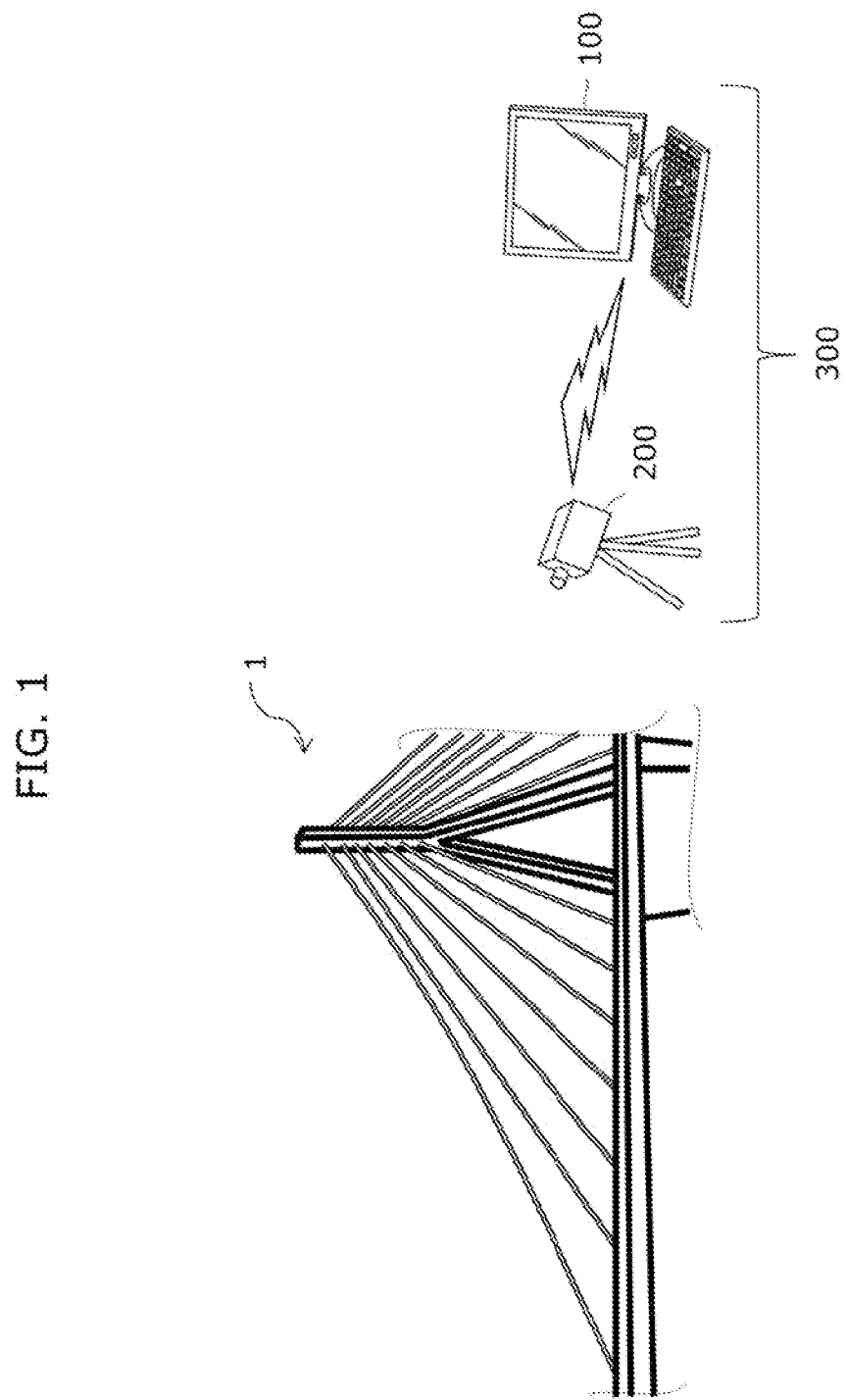
FIG. 1 is a schematic diagram showing an example measurement system according to one exemplary embodiment.

DESCRIPTION OF EMBODIMENT (Underlying Knowledge Forming Basis of the Present Disclosure)

Infrastructural structures in Japan were intensively constructed and upgraded during the high economic growth period from the late 1950s to the early 1970s. These structures are thus considered to rapidly deteriorate in the coming decades. Against this backdrop, there is a growing demand for easy and simple, and low-cost methods of inspecting infrastructural structures. In inspecting an infrastructural structure, for example, a displacement of a target object is detected.

Methods used to detect a displacement of a target object include directly measuring the target object using a strain gauge, etc. and measuring the target object utilizing a detection result on the exterior of the target object by a noncontact sensor such as a laser and a camera. Of these methods, the measurement utilizing a detection result on the exterior of the target object can be used when a strain gauge is hard to be attached to the target object due to safety reasons, etc. and thus a direct measurement of the target object is difficult. Further, this measurement method does not require preparing scaffolding, etc., thus providing merits in terms of man-power and cost. In particular, a measurement method that uses a camera is attracting attention because the method simultaneously measures a plurality of points, enabling a statical analysis of the target object such as a difference in displacements of the target object between different points.

Measurement methods utilizing a detection result on the exterior of a target object include a method as disclosed in PTL 1 in which a moving image of the target object taken by an imaging device is analyzed by block matching to detect a displacement of the target object.

In block matching, a desired region in a target frame image is identified as a block to be tracked (hereinafter referred to as "tracking block"). A block that most matches the tracking block is then located within a search area in a reference frame image to calculate a displacement vector of such located block between the frame images. Here, the measurement of the displacement of the target object by block matching requires a texture (pattern) for identifying the tracking block within the target object. However, when the same textures (patterns) are present in a plurality of points within the target object, such plurality of points can be identified as tracking blocks. This results in a failure of defining the same tracking block between frame images. In particular, when the target object has a linear shape, a linear edge (edge is a point where a rapid change occurs in color and brightness) continues in a uniform manner along the tangential direction of the target object. For this reason, a region that is not desired is identified as a tracking block.

Here, a region that is not desired can be identified as a tracking block when block matching is applied in the tangential direction of the target object. Meanwhile, when a search area of block matching is limited to the normal direction of the target object, it is possible to identify, as a tracking block, a region that includes an edge of the target object within the search area. At this time, when the displacement of the target object in the tangential direction is small enough relative to the displacement in the normal direction, the region identified as the tracking block by block matching can be said as substantially the same as a desired tracking block. As such, it is possible to measure a displacement of the desired tracking block in a substantially correct manner.

In general, processing in block matching such as displacement measurement is performed in two directions of an obtained image, that is, a horizontal direction and a vertical direction. When block matching is applied on a target object that has a linear shape and is located at an angle relative to the ground, such as a cable of a cable-stayed bridge, the measurement results on both the horizontal direction and the vertical direction can include a displacement of the target object in the tangential direction.

In view of the above, the present inventors have arrived at the measurement method and the measurement device capable of solving the foregoing problems.

The measurement method according to an aspect of the present disclosure is a measurement method performed by a measurement device that measures a displacement of a target object. Such measurement method includes: obtaining a first image that includes the target object; causing a display to display the first image; receiving designation of a designation point on the first image; setting a plurality of set points on the target object, based on the designation point; identifying a direction of a line that connects two of the plurality of set points; generating a second image by rotating the first image, the second image being an image in which the direction of the line is horizontal or vertical; setting, in the second image, a measurement region that partially includes the line; and measuring a displacement of the target object in the measurement region, the displacement being a displacement in a direction orthogonal to the line.

With this, by rotating an image that includes the target object (e.g., a cable of a cable-stayed bridge) having a linear shape and located at an angle relative to the ground, it is possible to limit the direction orthogonal to the target object to the horizontal direction or the vertical direction of the image. This enables an easy and simple measurement of a displacement of the target object in the direction orthogonal to the target object.

Also, in the generating of the second image, the second image may be generated for each of a plurality of lines to obtain a plurality of second images, the plurality of lines each being the line, and the measuring may include measuring the displacement of the target object in the measurement region in each of the plurality of second images generated, the displacement being a displacement in the direction orthogonal to the line.

Also, the plurality of set points may include at least one corresponding point, or the at least one corresponding point and at least one representative point, the at least one corresponding point may be a point that is set on an edge of the target object or in proximity to the edge, based on the designation point, and the at least one representative point may be a point that is set on the edge of the target object or in proximity to the edge, based on the at least one corresponding point.

Also, when the at least one corresponding point comprises a single corresponding point, the at least one representative point may be set on the target object, based on the single corresponding point.

Also, when the at least one corresponding point comprises two or more corresponding points, the at least one representative point may be set in a portion on the target object, the portion being a portion between the two or more corresponding points.

Also, the at least one representative point that is set adjacent to the at least one corresponding point may be set at a position in which an angular difference is greater than or equal to a predetermined value, the angular difference being a difference between an angle in a tangential direction of the target object at the at least one representative point and an angle in the tangential direction of the target object at the at least one corresponding point.

Also, a first representative point among the at least one representative point may be set at a position in which an angular difference is greater than or equal to a predetermined value, the angular difference being a difference between an angle in a tangential direction of the target object at the first representative point and an angle in the tangential direction at a second representative point that is a representative point different from the first representative point among the at least one representative point, the second representative point being already set and adjacent to the first representative point.

Also, the at least one representative point may be set at a position from which respective distances to adjacent two of the plurality of set points are equal on the edge of the target object or in proximity to the edge.

Also, the at least one corresponding point may be the designation point.

Also, when an external designation point that is a designation point located outside of the target object is received in the receiving, the setting of the plurality of set points may include setting, as the at least one corresponding point, a point that is closest to the external designation point in a region in the first image, the region being identified as including the target object.

Also, the setting of the measurement region may include receiving designation on the target object in the second image, and setting, as the measurement region, a region that is based on the designation received on the second image.

Also, the setting of the measurement region may include identifying an edge of the target object in the second image, and setting, as the measurement region, a region that is based on the edge identified.

Also, the measuring may include measuring at least one of a frequency or an amplitude of a movement of the target object from the displacement of the target object in each of a plurality of directions that are orthogonal to the plurality of lines.

Also, the target object may be an object having a linear shape.

The measurement method according to another aspect of the present disclosure is a measurement method performed by a measurement device that measures a displacement of a target object. Such measurement method includes: obtaining a first image that includes the target object, the first image having a horizontal direction and a vertical direction; causing a display to display the first image; receiving designation of a designation point on the first image; identifying a direction of the target object on the first image, based on the designation point; generating a second image by rotating the first image to cause the direction to be aligned with a first direction that is approximately aligned with the horizontal direction or the vertical direction of the first image; setting a measurement region, in the second image, that partially includes the target object; and measuring a displacement of the target object in the measurement region, the displacement being a displacement in a second direction that is orthogonal to the first direction.

The foregoing measurement method may further include: setting a plurality of set points on the target object, based on the designation point; and identifying a line that extends in the direction and connects two of the plurality of set points.

Also, the target object may be an object whose edge has an angle at least partially relative to a horizontal direction or a vertical direction of the first image.

The measurement device according to an aspect of the present disclosure includes: an obtainer that obtains a first image that includes a target object; an outputter that outputs the first image; a receiver that receives designation of a designation point on the first image; a first setter that sets a plurality of set points on the target object, based on the designation point; a generator that identifies a direction of a line that connects two of the plurality of set points and generates a second image by rotating the first image, the second image being an image in which the direction is horizontal or vertical; a second setter that sets a measurement region, in the second image, that partially includes the line; and a measurer that measures a displacement of the target object in the measurement region, the displacement being a displacement in a direction that is orthogonal to the line.

The following describes an exemplary embodiment of the measurement method and the measurement device according to the present disclosure with reference to the drawings. The exemplary embodiment disclosed below is a mere example, and therefore does not limit the scope of the measurement method and the measurement device according to the present disclosure.

In the exemplary embodiment disclosed below, a more detailed description than is necessary can be omitted. For example, a detailed description of a well-known matter or an overlapping description of substantially the same configurations can be omitted. This is to prevent the following description from becoming unnecessarily redundant and to facilitate the understanding of those skilled in the art.

The exemplary embodiment described below shows a general or specific example. The numerical values, shapes, elements, the arrangement and connection of the elements, steps (processes), the processing order of the steps etc. shown in the following exemplary embodiment are mere examples, and therefore do not limit the scope of the appended Claims and their equivalents. Therefore, among the elements in the following exemplary embodiment, those not recited in any one of the independent claims are described as optional elements.

The drawings are schematic views, and are not always strictly drawn. In the drawings, substantially the same elements are assigned the same reference marks and their overlapping descriptions can be omitted or given in a simplified manner.

Embodiment

Hereinafter, the measurement method and so forth according a certain exemplary embodiment are described in greater detail with reference to the accompanying Drawings.

[1-1. Outline of Measurement System]

Figure 2:
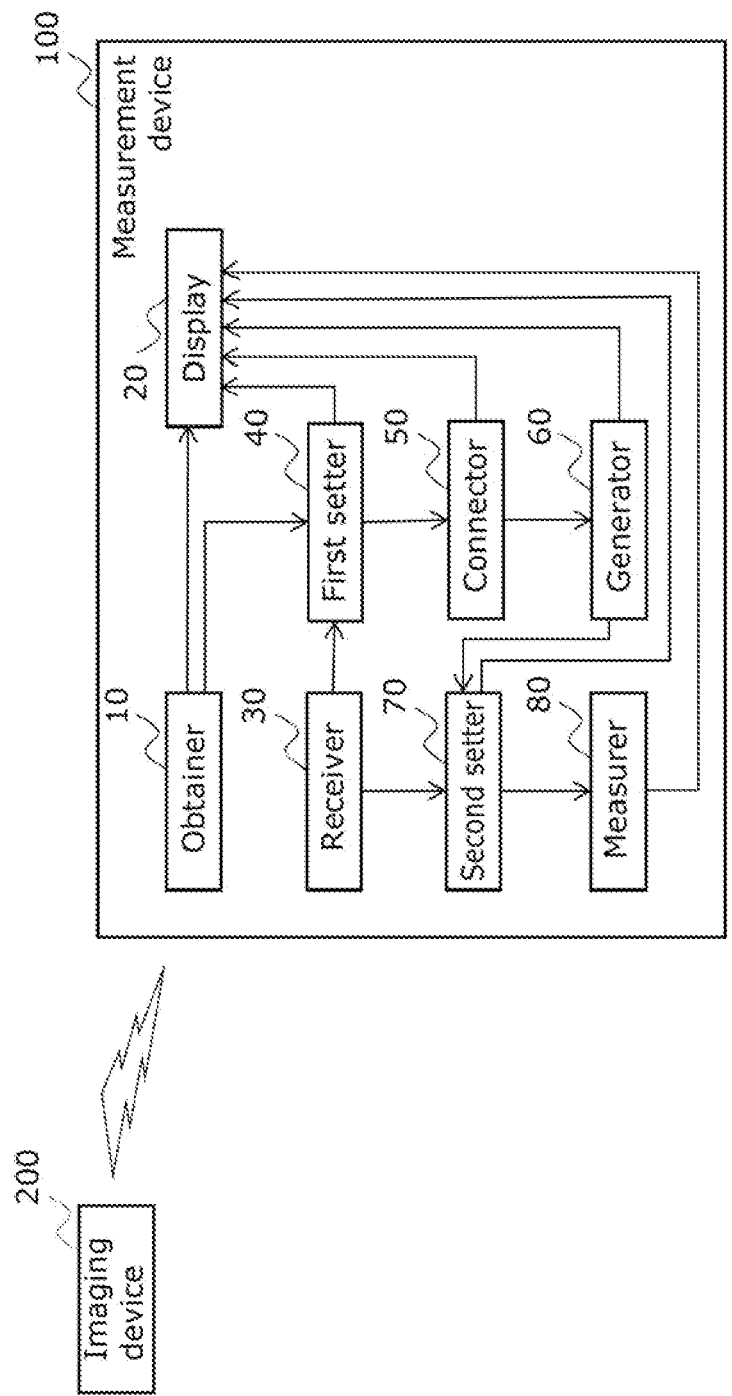
FIG. 2 is a block diagram showing an example functional configuration of the measurement system according to one exemplary embodiment.

With reference to FIG. 1, the following specifically describes an outline of the measurement system according to the embodiment. FIG. 1 is a schematic diagram showing an example of measurement system 300 according to the embodiment. FIG. 2 is a block diagram showing an example functional configuration of measurement system 300 according to the embodiment.

As shown in FIG. 1 and FIG. 2, measurement system 300 includes measurement device 100 and imaging device 200. Measurement system 300 displays, on a display of measurement device 100, a first image which is a moving image that includes target object 1, and receives designation of at least one designation point on the first image. Through this, measurement system 300 measures a displacement of target object 1 in a direction orthogonal to target object 1. According to measurement system 300, it is possible to calculate a displacement of a target object having a linear shape in an easy and simple manner by rotating the first image. This enables the normal direction of target object 1 to be aligned with the horizontal direction or the vertical direction of an image in which a search area of block matching is set. As such, it is possible to reduce the amount of computation required to calculate a displacement of target object 1, compared to the case where a search area is set in each of the horizontal direction and the vertical direction with respect to the display.

Target object 1 may be: a structure such as a cable-stayed bridge; equipment such an electric wire and piping; or a device or a component included in such structure or equipment. In particular, the present measurement system provides significant advantages when used to measure a displacement of an object that has a linear shape and is located at an angle relative to the ground, such as a cable of a cable-stayed bridge. This is because a camera performs imaging in many cases in an orientation in which its horizontal direction is aligned with the horizontal direction of the Earth. In this case, an image taken by such camera shows a linear object at an angle. Here, the linear shape is, for example, a line, a long thin shape, etc.

The following describes the devices included in measurement system 300.

[1-2. Configuration of Imaging Device]

Imaging device 200 is, for example, a digital video camera or a digital still camera that includes an imaging sensor. Imaging device 200 may take an image of target object 1 that is, for example, under a predetermined external load. Note that imaging device 200 may take an image of target object 1, for example, only under a self-weight without an external load. Also, imaging device 200 may perform either monochrome imaging or color imaging. Stated differently, images taken by imaging device 200 may either be monochrome Images or color images. Also, images taken by imaging device 200 are two-dimensional images.

Here, the predetermined external load may be load, a wind pressure, or sound that is generated when a moving object, such as a vehicle and a train, passes through. The term "predetermined" may mean not only the case where an external load has a constant magnitude and is applied in a constant direction but also the case where such magnitude or direction varies.

Note that the description of FIG. 1 provides an example case where measurement system 300 includes single imaging device 200, but measurement system 300 may include two or more imaging devices 200. Two or more imaging devices 200 may be disposed, for example, along target object 1. In this case, each of two or more imaging devices 200 takes a moving image of target object 1. Disposed in positions from which images of all segmented parts of target object 1 can be captured, imaging devices 200 are capable of taking images of target object 1 at one time when, for example, target object 1 cannot be contained in one moving image. This results in reduction in man-hours.

Two or more imaging devices 200 may also be disposed on both sides of target object 1. Stated differently, two or more imaging devices 200 may be disposed opposing each other across target object 1, or may be disposed to surround target object 1. In this case, two or more Imaging devices 200 capture moving images of different parts and surfaces of target object 1 from different directions. By being able to take images of different parts and surfaces of target object 1 from different directions at one time, for example, two or more imaging devices 200 reduce man-hours. Also, images taken from mutually different directions are effective because such images enable the observation of displacements of target object 1 that cannot be measured from images taken from the same direction.

Note that when measurement system 300 includes two or more imaging devices 200, these imaging devices 200 may perform imaging either asynchronously or synchronously. Synchronous imaging enables a comparison or analysis of moving images simultaneously captured by two or more imaging devices 200.

Note that FIG. 1 shows an example case where imaging device 200 is capable of performing imaging only in one direction, but imaging device 200 may be an imaging device capable of performing imaging in a plurality of directions or all directions. With this, it is possible for single imaging device 200 to, for example, simultaneously take images of a plurality of parts of target object 1.

Note that imaging device 200 is not limited to the foregoing example imaging devices, and thus may be, for example, a distance-measuring camera or a stereo camera.

[1-3. Configuration of Measurement Device]

Measurement device 100 is a device that displays, on display 20, a first image that is a moving image which includes target object 1, and receives designation of at least one designation point on the first image, thereby measuring a displacement of target object 1 in a direction orthogonal to target object 1. Measurement device 100 is, for example, a computer that includes a processor (not illustrated) and a memory (not illustrated) on which a software program or instructions are stored. The processor executes the software program, thereby enabling measurement device 100 to implement a plurality of functions to be described later. Alternatively, measurement device 100 may include dedicated electronic circuitry (not illustrated). In this case, the functions to be described later may be implemented by individual electronic circuits or a single integrated electronic circuit.

As shown in FIG. 1, measurement device 100 obtains, from external imaging device 200, a first Image that includes target object 1. Measurement device 100 and imaging device 200 may be connected, for example, to be able to perform communications with each other. In this case, measurement device 100 and imaging device 200 may perform communications by a wireless communication protocol such as Bluetooth® or a wired communication protocol such as Ethernet®. Note that measurement device 100 and imaging device 200 may not be connected to each other in a communicable manner. For example, measurement device 100 may obtain the first image from imaging device 200 via a removable memory such as a universal serial bus (USB) memory. Stated differently, measurement device 100 may obtain the first image taken by Imaging device 200 from imaging device 200 by reading the first image from a removable memory in which the first image is stored.

As shown in FIG. 2, measurement device 100 includes obtainer 10, display 20, receiver 30, first setter 40, connector 50, generator 60, second setter 70, and measurer 80.

Obtainer 10 obtains the first image that includes target object 1 from imaging device 200, and outputs the obtained first image to display 20. Here, the first image has the horizontal direction and the vertical direction.

Display 20 displays an image or a moving image. More specifically, display 20 obtains a first image or a second image outputted from obtainer 10 or generator 60, and displays the obtained image. Display 20 may also display: a designation point received by receiver 30; a corresponding point or a set point set by first setter 40; a line generated by connector 50; a measurement region set by second setter 70; and a displacement of target object 1 measured by measurer 80. Display 20 may further display various items of information to be presented to a user. Display 20 includes, for example, a liquid crystal display, an organic electroluminescence (organic EL) display, etc. Display 20 displays images and character information.

Receiver 30 receives an operation from the user. Receiver 30 outputs a signal indicating the received operation to first setter 40 or second setter 70, depending on the image displayed on display 20. For example, when the first image is displayed on display 20, receiver 30 receives a designation point designated by the user on the first image displayed on display 20 and outputs a signal indicating the position of such received designation point to first setter 40. Meanwhile, when the second image is displayed on display 20, receiver 30 outputs a signal for setting a measurement region to second setter 70. Receiver 30 is, for example, a keyboard, a mouse, a touch panel, or a microphone. Receiver 30 may be disposed over a display region of display 20 just like a touch panel. Receiver 30 detects, for example, the location on the touch panel touched by a finger of the user and outputs location information indicating the detected location to first setter 40 or second setter 70. More specifically, when a user's finger touches the first Image or the second image displayed on display 20, the touch panel detects the location touched by the finger. Receiver 30 outputs, to first setter 40 or second setter 70, the location information indicating such detected location as an operation signal indicating the operation received from the user. The touch panel may be a capacitive touch panel or a pressure-sensitive touch panel.

Receiver 30 may also be a pointing device that receives an operation for moving a pointer displayed on display 20 to another location just like a mouse, and receives location information corresponding to the location of the pointer. Receiver 30 may detect the location of the pointer in the display region of display 20, thereby outputting the location information indicating the detected location to first setter 40 or second setter 70 as an operation signal indicating the operation received from the user.

First setter 40 obtains the image outputted from obtainer 10, and identifies at least one region that includes target object 1 in the obtained Image. Subsequently, first setter 40 obtains the operation signal outputted from receiver 30, and sets, on the first image, one corresponding point for each of at least one designation point designated by the user, on the basis of the obtained operation signal. Corresponding points correspond to the at least one designation point, and thus the number of corresponding points is the same as the number of designation points. Further, first setter 40 sets a plurality of set points that include the at least one corresponding point, on the basis of the at least one corresponding point that has been set. A plurality of set points may be set, for example, on the same edge of target object 1. The set points may include only a plurality of corresponding points.

Alternatively, the set points may include at least one corresponding point and at least one representative point. Here, the representative point is a point that is different from a corresponding point and is set in a region on target object 1 in the first image on the basis of the corresponding point. The user may previously specify whether the set points include only corresponding points or include corresponding points and the representative point.

Connector 50 obtains a plurality of set points, and connects adjacent two of the plurality of set points with a line, thereby generating one polygonal line formed of one line or a plurality of lines.

Generator 60 obtains the line, and generates a second image in which the line is horizontal or vertical relative to display 20. More specifically, generator 60 detects a line that is in the horizontal direction of display 20 and angle θ of the line. Subsequently, generator 60 rotates the first image by −θ° or (90−θ°), thereby generating a second image in which the line is horizontal or vertical. In the second image, the line may be approximately horizontal or approximately vertical. In this case, the line may include an error of some degrees relative to the horizontal direction or the vertical direction.

When the user performs an operation on receiver 30 while the second image is displayed on display 20, second setter 70 obtains an operation signal outputted from receiver 30, and sets at least one measurement region, on the second image, that partially includes the line, on the basis of the obtained operation signal. When no operation signal is outputted from receiver 30 for a predetermined period after the second image is displayed on display 20, second setter 70 may automatically set a measurement region, on the second image, at a position that is based on an edge of target object 1 so that such edge is included in the second image. Second setter 70 may set a measurement region in any of the following positions: on an edge of target object 1; at a position on target object 1 that is a predetermined distance (k pixels, where k is an integer) spaced apart from an edge; and in a region between two edges that are a predetermined distance (k pixels) spaced apart from each other. Second setter 70 may also set measurement regions that are, for example, located at equal intervals, that are as many as the number previously specified by the user, or that are located at intervals previously specified by the user. Also, a measurement region may be a block having an area of a certain size, or may be a point.

Measurer 80 obtains the at least one measurement region and measures, for each of the at least one measurement region, a displacement of target object 1 in a direction that is orthogonal to the line on target object 1. More specifically, measurer 80 may measure, for each of at least one measurement region, a displacement of target object 1 in a direction that is orthogonal to the line on target object 1. Stated differently, measurer 80 may measure a displacement of target object 1 only in one of the horizontal direction and the vertical direction of the second image. The displacement of target object 1 in each of a plurality of measurement regions (i.e., displacement) is the amount of spatial changes representing the direction and distance of a movement, such as, for example, a displacement vector representing the displacement of target object 1. Here, the distance of the movement does not indicate the distance for which target object 1 has actually moved, but a value corresponding to the distance for which target object 1 has actually moved. The distance of the movement is, for example, the number of pixels in each measurement region in the second image corresponding to the distance for which target object 1 has actually moved. Measurer 80 may derive, for example, a displacement vector of target object 1 of each measurement region as the displacement of target object 1 of each measurement region. In this case, measurer 80 uses, for example, block matching to estimate the displacement of each measurement region, thereby deriving a displacement vector of target object 1 of each measurement region. Measurer 80 may further measure the frequency and amplitude of the displacements of target object 1, on the basis of the displacement of target object 1 of each measurement region. With this, it is possible to predict the degree of fatigue damage of target object 1 to perform a maintenance work at appropriate timing.

Note that receiver 30 and display 20 may be included in, for example, a device other than measurement device 100. Also, a computer is described as an example of measurement device 100, but measurement device 100 may be provided on a server connected via a communications network such as the Internet.

Note that each of the first image and the second image is an image in which a plurality of pixels are arranged in the horizontal direction and the vertical direction. The second image that is generated by converting the first image may be an image whose pixel array is the same as that of the first image. Stated differently, the first image and the second image may be images in which the number of horizontal pixels is "m" and the number of vertical pixels is "n", where "m" is an integer greater than or equal to 2 and "n" is an integer greater than or equal to 2. Note that "n" and "m" may either be equal values or different values. The first image and the second image may also be images in which at least one of the number of horizontal pixels or the number of vertical pixels is different.

[1-4. Operation of Measurement Device]

Working Example 1

Figure 3:
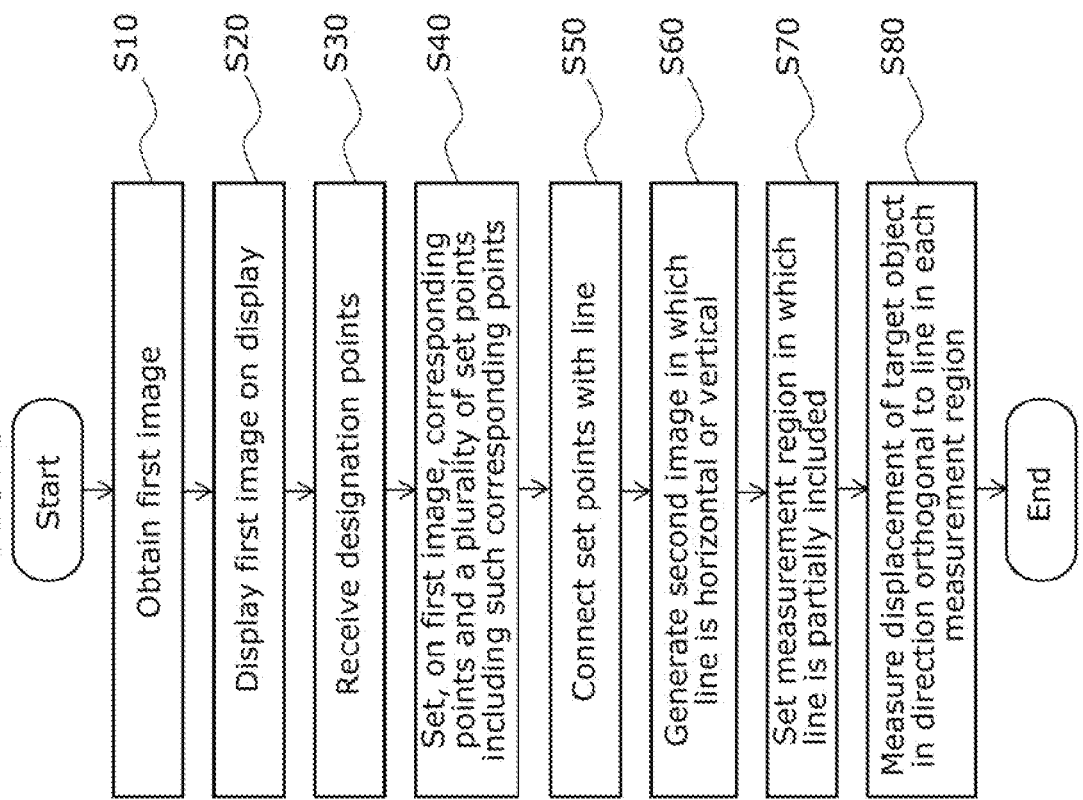
FIG. 3 is a flowchart of an example operation performed by the measurement device according to one exemplary embodiment.

With reference to FIG. 3, the following describes an example operation performed by measurement device 100 according to one exemplary embodiment of the present disclosure. FIG. 3 is a flowchart of an example operation performed by measurement device 100 according to one exemplary embodiment.

As shown in FIG. 3, obtainer 10 obtains a first image that includes target object 1 (obtaining step S10). Measurement device 100 may obtain first images one by one every time imaging device 200 performs imaging, or may obtain, at predetermined time intervals, a plurality of first images that are taken during a predetermined period and stored in imaging device 200. Note that measurement device 100 may obtain, from imaging device 200, at least one first image that includes target object 1 after imaging device 200 finishes taking images of target object 1. Obtainer 10 may obtain a first image by any methods. As described above, obtainer 10 may obtain a first image by wireless communication or via a removable memory such as a USB memory.

Figure 4:
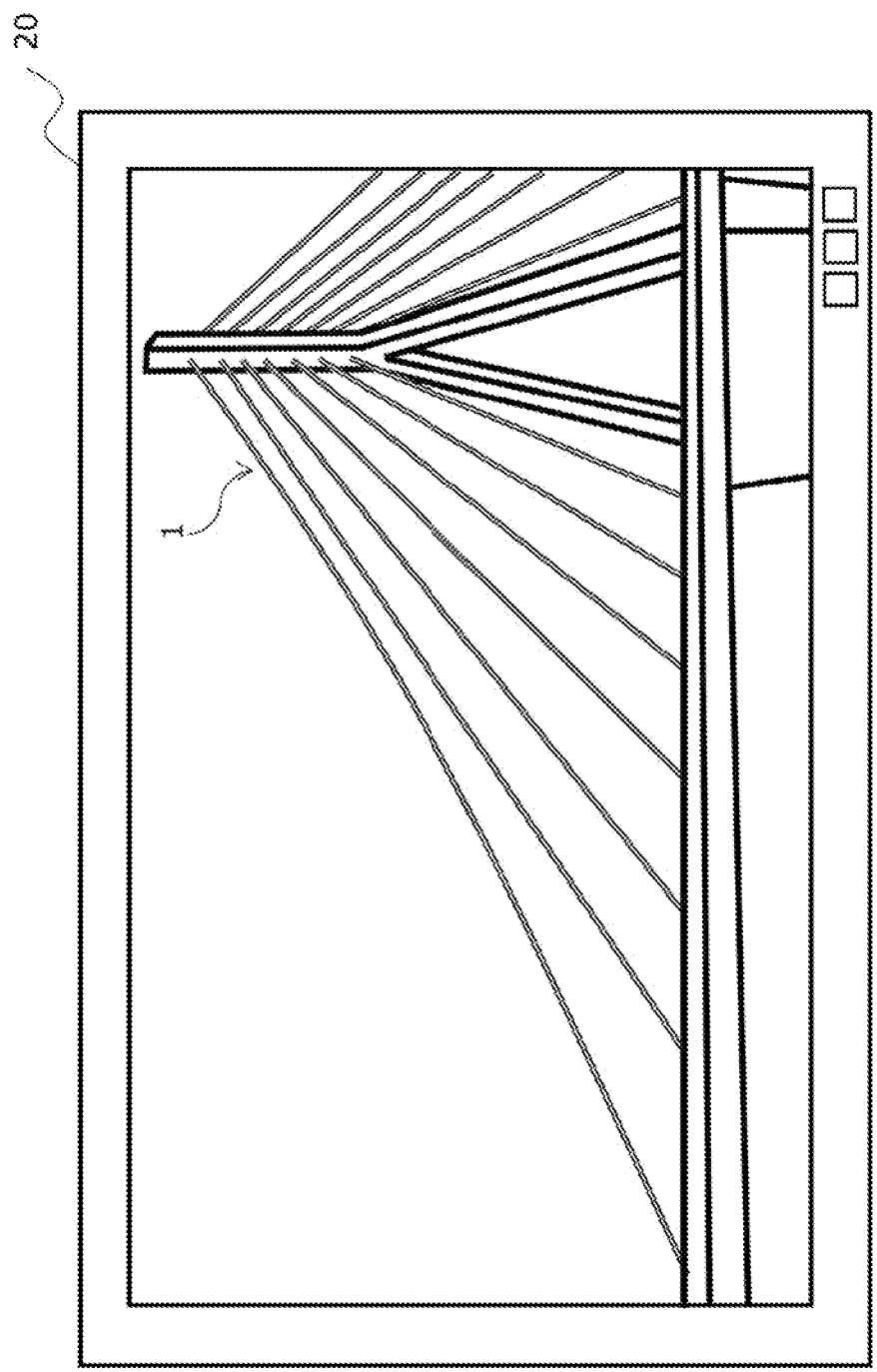
FIG. 4 is a diagram showing an example first image displayed by a display.

Next, display 20 displays the first image obtained by obtainer 10 in obtaining step S10 (displaying step S20). FIG. 4 is a diagram showing an example of the first image displayed by display 20. As shown in FIG. 4, target object 1 is, for example, a cable of a cable-stayed bridge.

Figure 5:
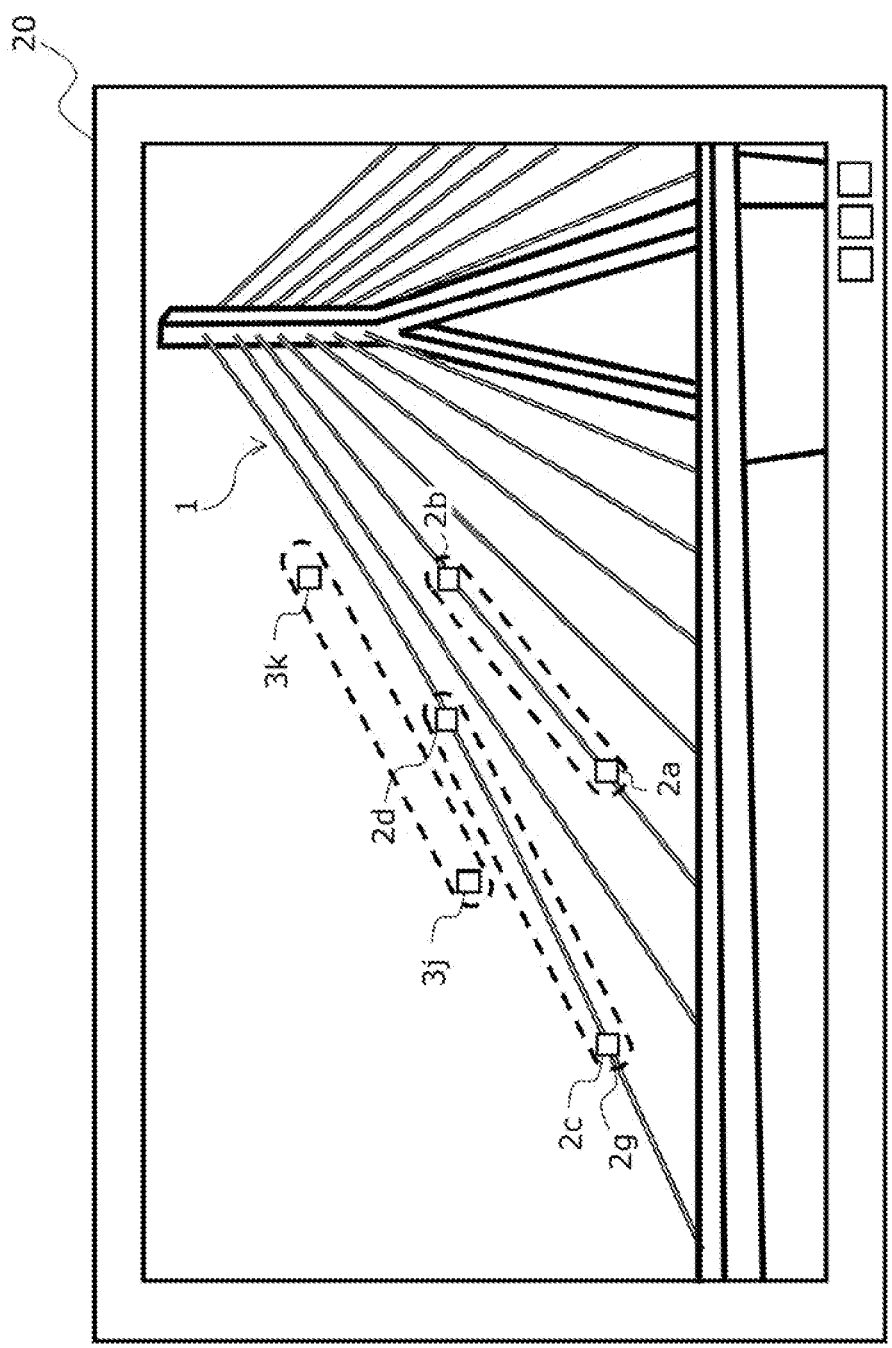
FIG. 5 is a diagram showing an example of at least two designation points designated in the first image displayed on the display.

Next, receiver 30 receives at least two designation points in the first image displayed by display 20 in displaying step S20 (receiving step S30). Receiver 30 outputs the at least two designation points designated to first setter 40. FIG. 5 is a diagram showing an example of the at least two designation points designated in the first image displayed on display 20. FIG. 5 shows the following cases: designation points 2a and 2b are designated on a cable having a substantially linear shape (Working Example 1); designation points 2c and 2d are designated on a curving cable (Working Examples 2 and 3); a single designation point 2g is designated on a cable (Working Example 4); and external designation points 3j and 3k are designated that are designation points distant from a cable, i.e., outside of target object 1 (Working Example 5). In Working Example 1, when two designation points 2a and 2b are designated in the first image as shown in FIG. 5, receiver 30 outputs information on the positions of designation points 2a and 2b to first setter 40.

Figure 6A:
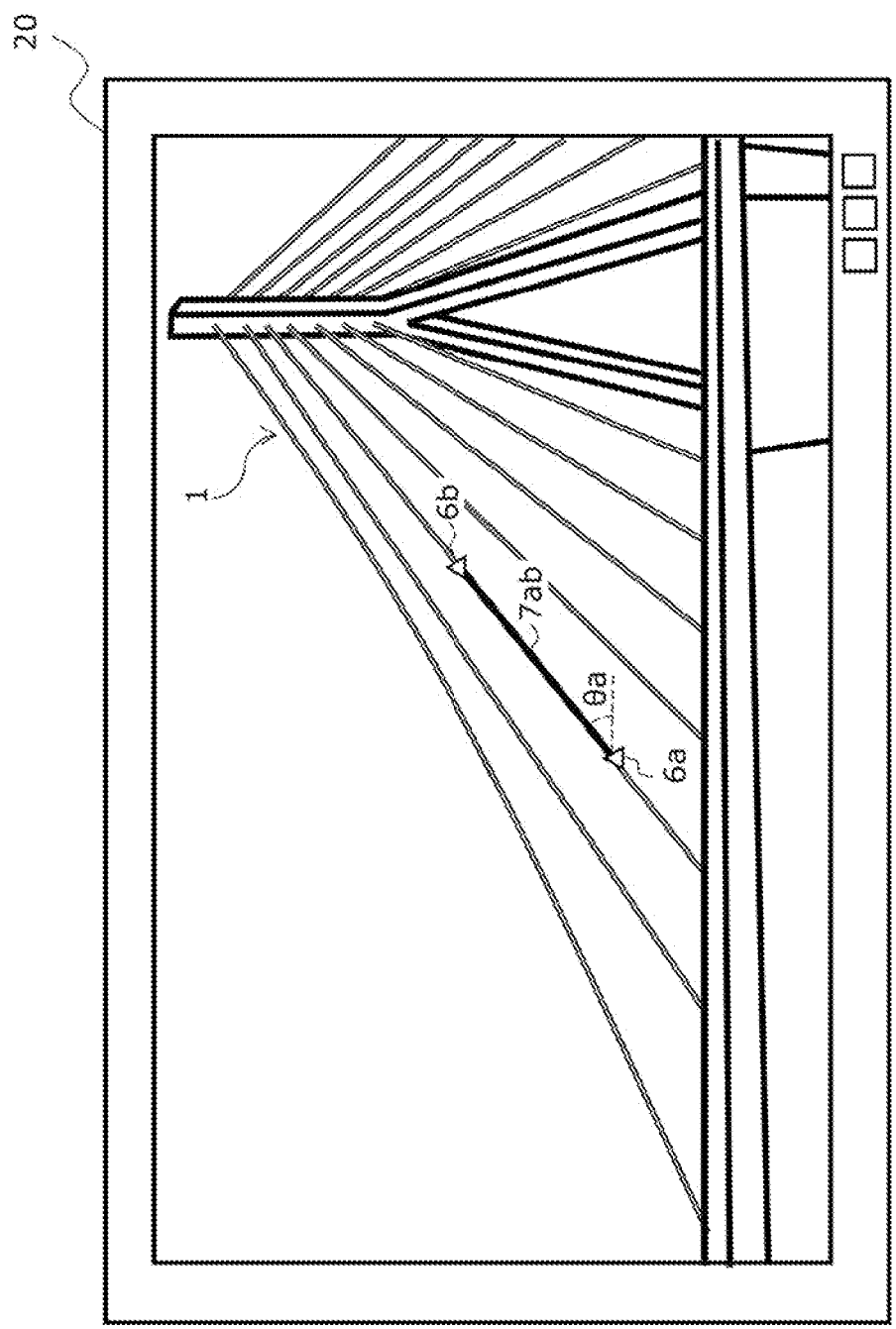
FIG. 6A is a diagram showing an example line that is set in the first image on the basis of set points.

Next, first setter 40 sets corresponding points in the first image on the basis of the at least two designation points designated (here, designation points 2a and 2b), and further sets set points from the corresponding points (first setting step S40). With reference to FIG. 6A, the following describes a method of setting corresponding points and set points. FIG. 6A is a diagram showing an example of the set points that are set on the basis of the at least two designation points designated by the user in the first image, the line that is set on the basis of the set points, and the result of detecting an angle of the line. As shown in FIG. 6A, first setter 40 sets corresponding points in the first image, on the basis of the operation of the user received by receiver 30 in receiving step S30 (here, the operation of the user is information on the positions, etc. of designation points 2a and 2b designated by the user on target object 1). Here, since the designation points are designated on target object 1, corresponding points are set at the same positions as those of the designation points. More specifically, first setter 40 obtains, for example, two designation points 2a and 2b designated by the user, and sets these two designation points 2a and 2b as they are as two corresponding points, on the basis of two designation points 2a and 2b obtained. Here, the number of the designation points and the number of the corresponding points are the same. Subsequently, first setter 40 sets the two corresponding points as set points 6a and 6b. More specifically, first setter 40 sets, for example, two corresponding points 4a and 4b as they are as two set points 6a and 6b, on the basis of two corresponding points 4a and 4b. Here, the number of the corresponding points and the number of the set points are the same. Stated differently, the number of the designation points and the number of the set points are also the same. When determining that designation points are set on target object 1, first setter 40 may set such designation points as set points without setting corresponding points.

Subsequently, connector 50 connects, with a line, the at least two set points that are set by first setter 40 in the first image in first setting step S40 (connecting step S50). When only two set points are present, connector 50 is simply required to connect these set points with a line. When three or more set points are present, connector 50 connects each set point with a line to adjacent one or two set points on the target object. Through this, a plurality of lines form a single polygonal line. With reference to FIG. 6A, the following more specifically describes a method of connecting the set points. As shown in FIG. 6A, connector 50 connects, with a line, the at least two set points that are set earlier in the first image. More specifically, connector 50 obtains, for example, two set points 6a and 6b, and connects these two set points 6a and 6b with line 7ab, on the basis of set points 6a and 6b obtained. Line 7ab is, for example, a line segment that connects two set points 6a and 6b.

Figure 6B:
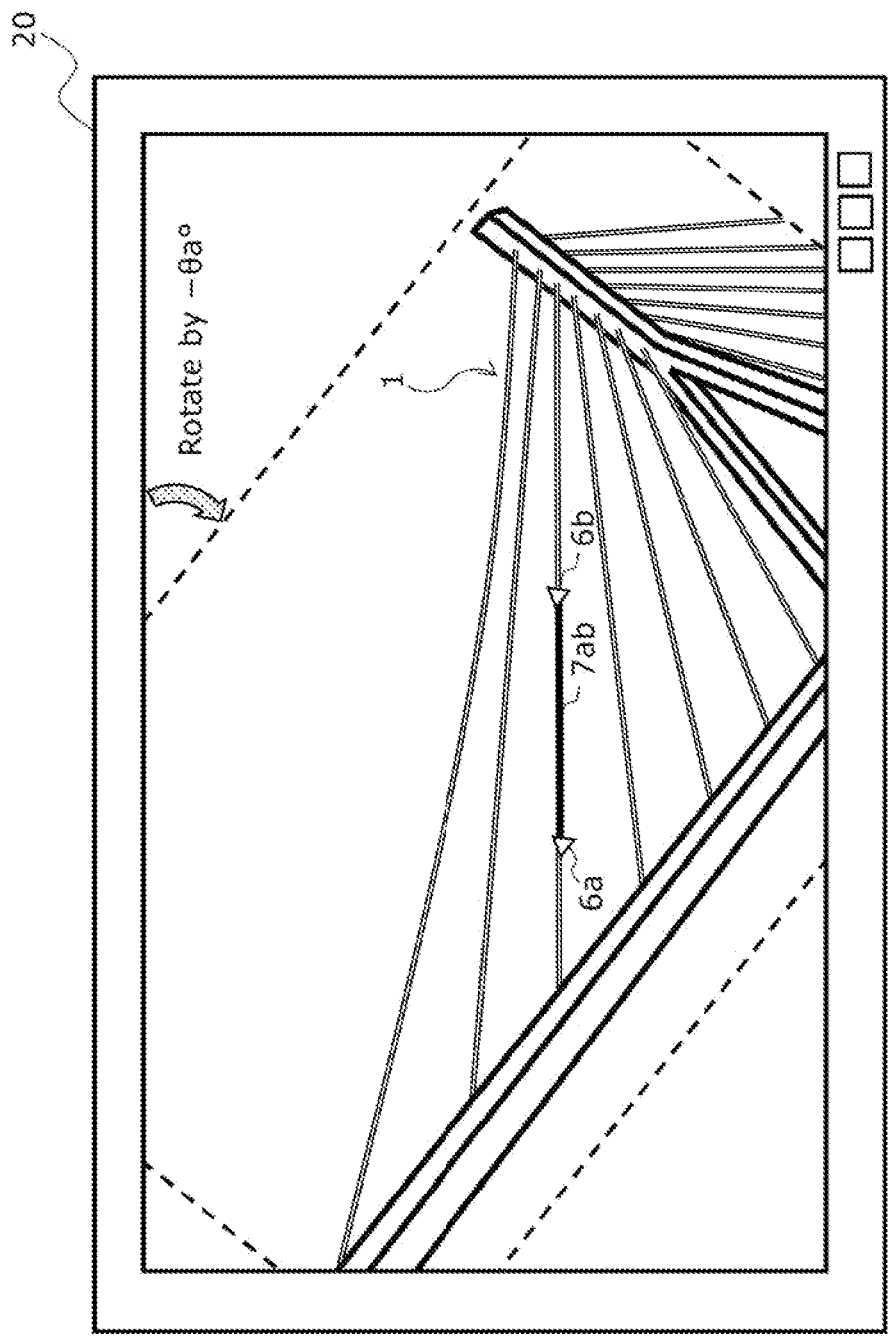
FIG. 6B is a diagram showing an example second image generated on the basis of the line.

Next, generator 60 generates a second image in which the line set by connector 50 is horizontal or vertical (generating step S60). With reference to FIG. 6A and FIG. 6B, the following more specifically describes a method of generating the second image. As shown in FIG. 6A, generator 60 obtains line 7ab, and detects angle θa of the line. FIG. 6B is a diagram showing an example of the second image generated on the basis of the line. As shown in FIG. 6B, the first image is rotated by −θa° with respect to display 20, thereby generating a second image in which line 7ab is horizontal. Here, the first image may be rotated by (90−θa)° to generate a second image in which line 7ab is vertical. Note that only a single line is present in FIG. 6A and FIG. 6B, but when a plurality of lines are present, generator 60 generates a plurality of second images in which the respective lines are horizontal or vertical. A specific example of this will be described in Working Example 2.

In the present embodiment, a negative rotation angle means that the first image is to be rotated in clockwise and a positive rotation angle means that the first image is to be rotated counterclockwise. Note that a relation between whether the first image is to be rotated clockwise or counterclockwise and whether the rotation angle is negative or positive may be the reverse of the foregoing description. Also, the rotation center about which the first image is rotated is, for example, the center (barycenter) of the first image. Note that the rotation center may be set at any points in the first image so long as the entirety of line 7ab is included in the second image generated by rotating the first image.

Figure 6C:
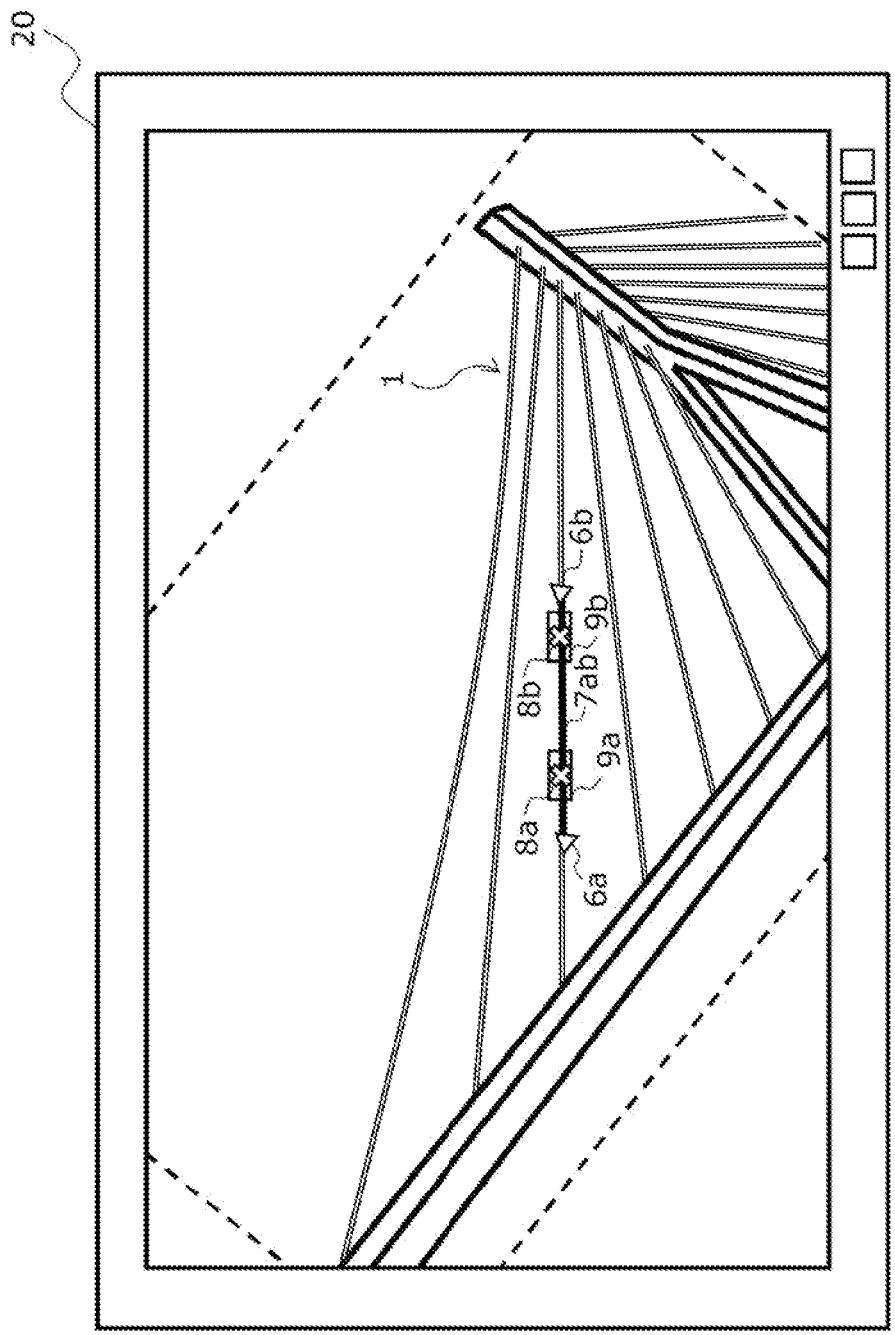
FIG. 6C is a diagram showing an example of at least one measurement point that is designated in the second image displayed on the display and at least one measurement region that is set on the basis of the measurement point.

Subsequently, second setter 70 sets a measurement region in the second image (second setting step S70). More specifically, when receiver 30 receives designation of at least one measurement point on target object 1 in the second image, second setter 70 sets a measurement region in the second image on the basis of the at least one measurement point received by receiver 30 (here, measurement points 8a and 8b). Here, when receiving designation of at least one measurement point, receiver 30 outputs such at least one measurement point designated to second setter 70. Here, the measurement point is a point for specifying the position of a measurement region. FIG. 6C is a diagram showing an example of the at least one measurement point that is designated in the second image displayed on display 20 and the at least one measurement region that is set on the basis of the at least one measurement point. As shown in FIG. 6C, when two measurement points 8a and 8b are designated in the second image, receiver 30 outputs, to second setter 70, information on the positions, etc. of measurement points 8a and 8b.

With reference to FIG. 6C, the following more specifically describes a method of setting the measurement regions. As shown in FIG. 6C, second setter 70 sets measurement regions at the positions of the measurement points in the second image, on the basis of an operation of the user received by receiver 30 (here, the operation of the user is the information on the positions, etc. of two measurement points 8a and 8b designated by the user). More specifically, second setter 70 obtains, for example, two measurement points 8a and 8b designated by the user, and sets two measurement regions 9a and 9b that include the positions of two measurement points 8a and 8b, on the basis of two measurement points 8a and 8b obtained. Two measurement regions 9a and 9b are, for example, blocks having a predetermined area, where the positions of two measurement points 8a and 8b serve as the respective centers. Here, the number of the measurement points and the number of the measurement regions are the same. Note that the measurement regions are not limited to blocks having a predetermined area, and thus the measurement points per se may serve as the measurement regions.

Subsequently, measurer 80 obtains two measurement regions 9a and 9b, and measures a displacement of target object 1 in a direction orthogonal to line 7ab on target object 1 for each of two measurement regions 9a and 9b (measuring step S80). Here, the displacement of target object 1 in each of a plurality of measurement regions 9a and 9b (i.e., displacement) is the amount of spatial changes indicating the direction and distance of a movement. Such displacement is, for example, a displacement vector representing displacement of target object 1. Measurer 80 derives, for example, a displacement vector of target object 1 in each of measurement regions 9a and 9b as the displacement of target object 1 in each of measurement regions 9a and 9b. In this case, measurer 80 uses block matching to estimate the displacement in each of measurement regions 9a and 9b, thereby driving the displacement vectors of target object 1 in the respective measurement regions 9a and 9b.

More specifically, measurer 80 sets a search area of block matching in each of measurement regions 9a and 9b on the second image. Here, measurer 80 may set a search area of block matching only in the direction that is orthogonal to the line on target object 1. Here, the displacement of target object 1 in the normal direction is sufficiently large relative to the displacement in the tangential direction. Further, although the same linear edge continues in the tangential direction of target object 1, blocks including a linear edge of target object 1 are identifiable in the normal direction on the basis of the difference from the background. For this reason, it is possible to measure the displacement of target object 1 in each of measurement regions 9a and 9b in an easy and simple manner, using block matching. Measurer 80 may further measure the movement of target object 1 and the frequency and amplitude of the movement of target object 1, on the basis of the displacement of target object 1 in each of measurement regions 9a and 9b.

Figure 6D:
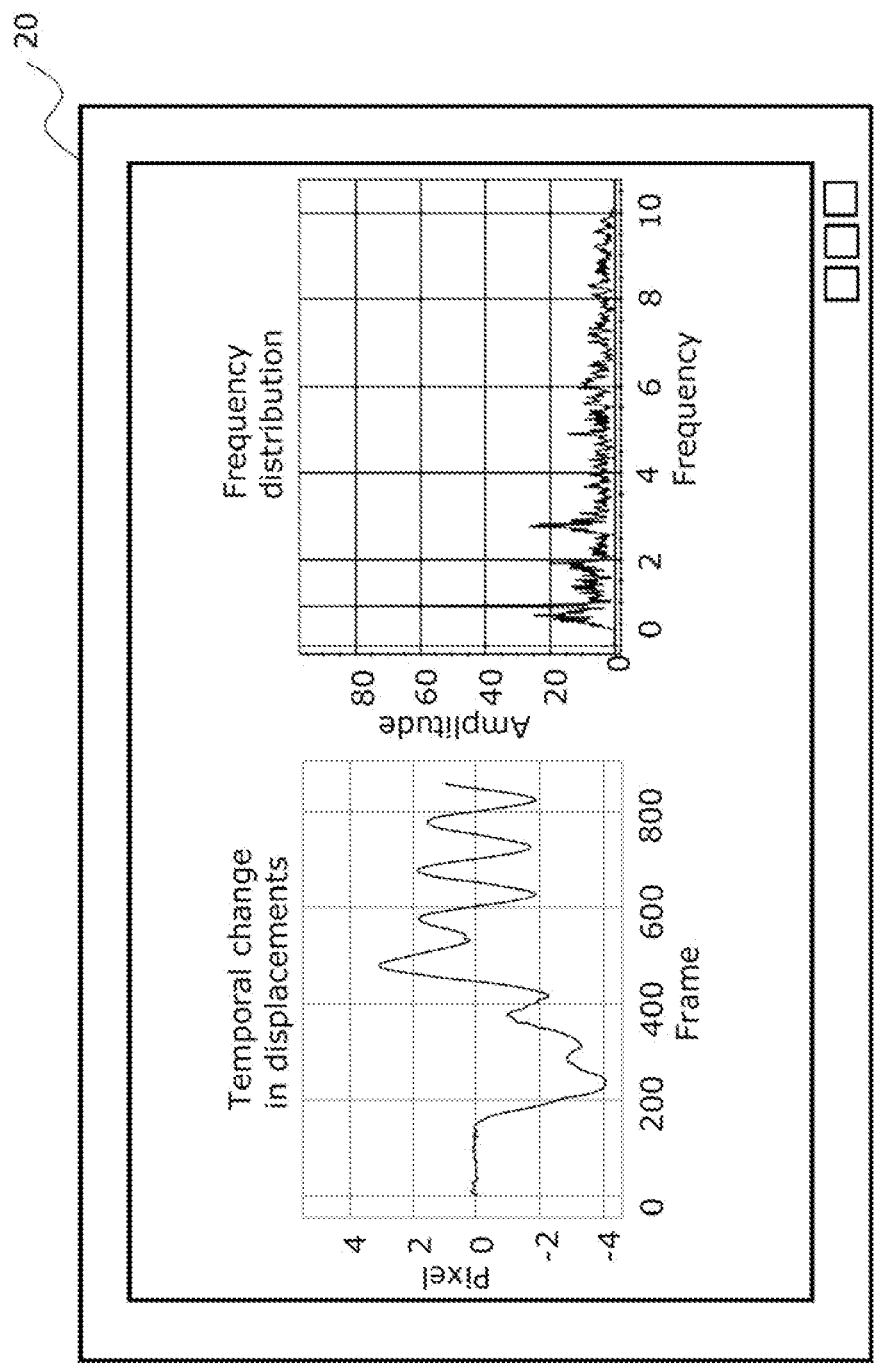
FIG. 6D is a diagram showing an example measurement result outputted by a measurer onto the display.

FIG. 6D shows an example measurement result outputted from measurer 80 onto display 20. As shown in FIG. 6D, for example, measurer 80 outputs, to display 20, temporal changes in the displacements of target object 1, and/or the frequency distribution of the displacements of target object 1. Stated differently, measurer 80 is capable of calculating, for example, the amplitude and frequency of the displacements of target object 1 from information on the pixels in each of the measurement regions in the respective still images (frames) in the moving image, using parameters such as the resolution of the imaging device and the frame rate. Note that information on the degree of fatigue damage of target object 1 may be estimated on the basis of the measurement result of measurer 80, and the estimated information may be outputted onto display 20. With this, it is possible to perform a maintenance work on target object 1 at appropriate timing.

Working Example 2

The following describes an operation performed by measurement device 100 according to Working Example 2 of the present disclosure.

The operation performed by measurement device 100 according to the present working example is the same as that of Working Example 1 other than the operation of first setter 40.

Figure 7A:
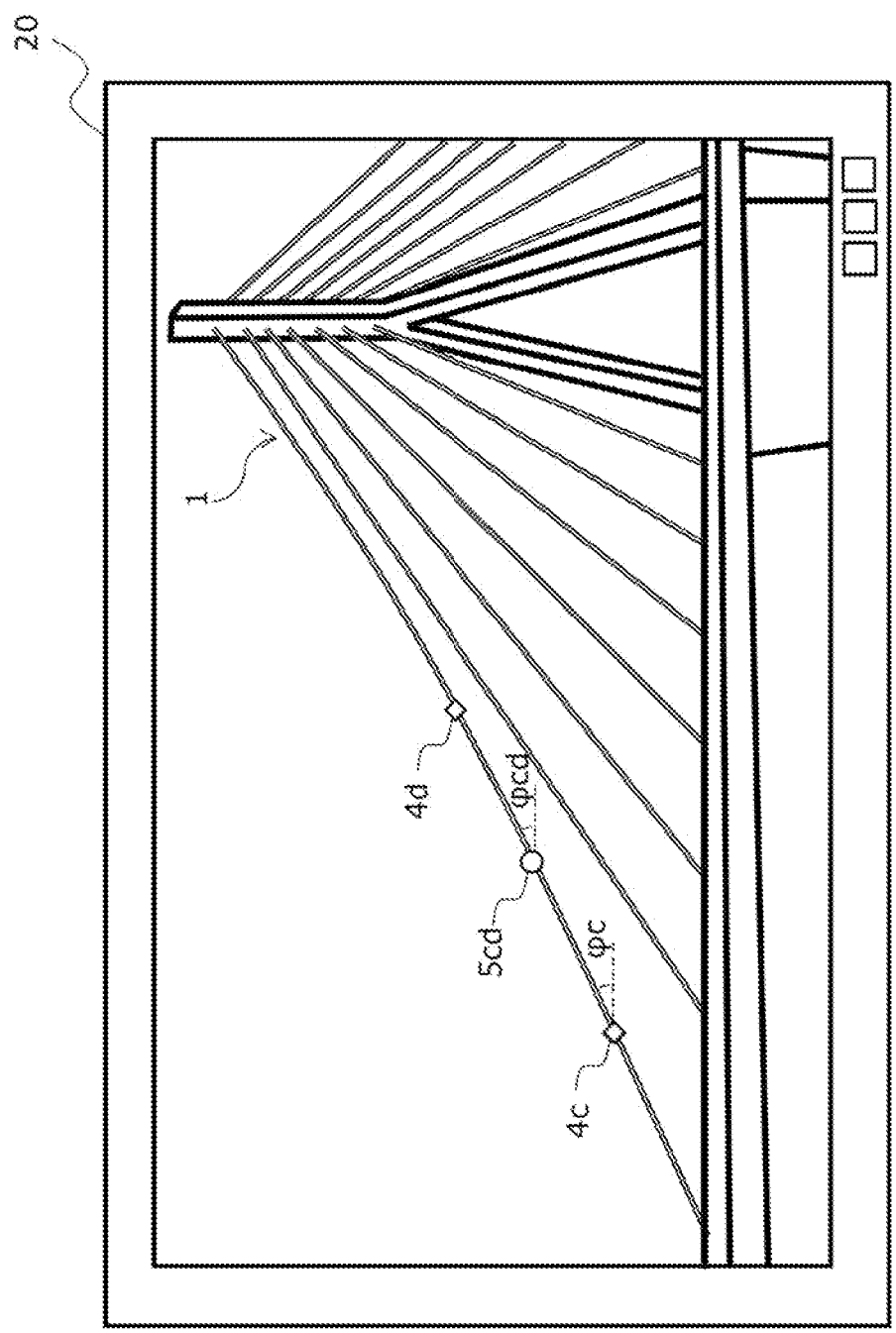
FIG. 7A is a diagram showing an example of corresponding points that are set on the basis of at least two points designated by a user in the first image and a representative point that is set on the basis of the corresponding points.

In the present working example, first setter 40 sets corresponding points 4c and 4d in the first image as shown in FIG. 7A, on the basis of the at least two designation points 2c and 2d designated as shown in FIG. 5, and further sets set points from corresponding points 4c and 4d (first setting step S40). With reference to FIG. 7A, the following mores specifically describes a method of setting the corresponding points.

FIG. 7A is a diagram showing an example of the corresponding points that are set on the basis of the at least two designation points designated by the user in the first image, and a representative point that is set on the basis of the corresponding points. As shown in FIG. 7A, first setter 40 sets corresponding points 4c and 4d in the first image at the positions of the designation points, on the basis of the operation of the user received by receiver 30 in receiving step S30 (here, the operation of the user is the information on the positions, etc. of two designation points 2c and 2d designated by the user). More specifically, first setter 40 obtains, for example, two designation points 2c and 2d designated by the user, and sets these two designation points 2c and 2d as they are as two corresponding points 4c and 4d, on the basis of two designation points 2c and 2d obtained. Here, the number of the designation points and the number of the corresponding points are the same. First setter 40 then sets, on the first image, a plurality of set points that include the at least two corresponding points (here, corresponding points 4c and 4d) and at least one representative point.

With reference to FIG. 7A, the following more specifically describes a method of setting the set points. As shown in FIG. 7A, first setter 40 sets at least one representative point on the basis of the at least two corresponding points 4c and 4d that are set earlier in the first image. More specifically, first setter 40 obtains, for example, two corresponding points 4c and 4d, and sets representative point 5cd that is different from two corresponding points 4c and 4d, on the basis of two corresponding points 4c and 4d obtained. In so doing, first setter 40 sets representative point 5cd in a position that is between two corresponding points 4c and 4d, i.e., in between two corresponding points 4c and 4d on target object 1. Even more specifically, representative point 5cd is set at an edge detected in that position on target object 1 which is between corresponding points 4c and 4d and at which a difference between angle φcd of the tangential line of target object 1 at representative point 5cd and angle φc of the tangential line of target object 1 at corresponding point 4c is greater than or equal to a predetermined value. Note that angle φc may also be the angle at corresponding point 4d, or may be an angle whose difference from the angle of the tangential line of target object 1 at corresponding point 4d is greater than or equal to a predetermined value. Note that the tangential line of target object 1 is a tangential line at the detected edge. The predetermined value of the difference between the angles may be previously specified by the user or may be set by first setter 40. First setter 40 sets three points of corresponding points 4c, 4d, and representative point 5cd as set points 6c, 6d, and 6cd, respectively.

Figure 7B:
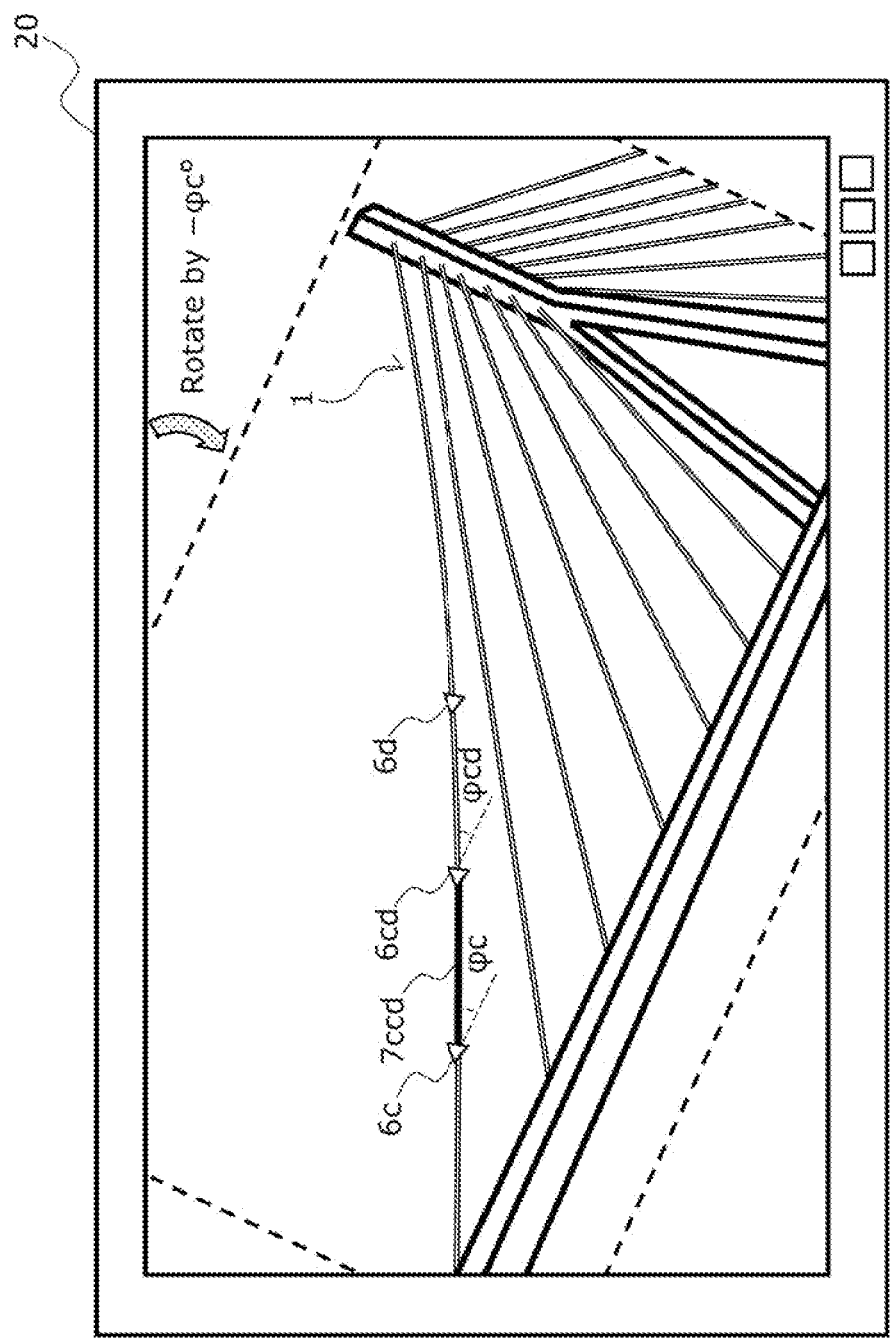
FIG. 7B is a diagram showing an example second image generated on the basis of a line.
Figure 7C:
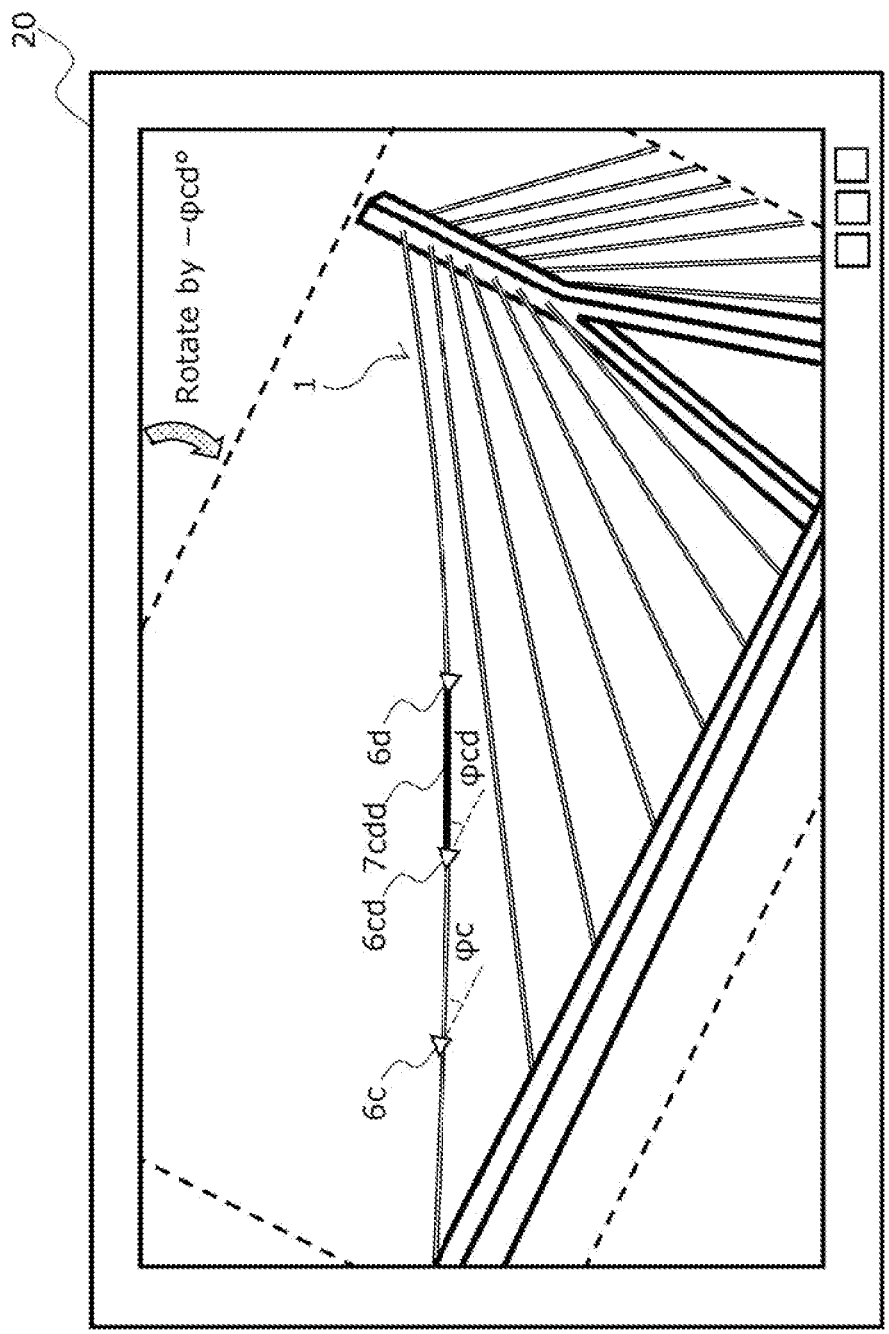
FIG. 7C is a diagram showing an example second image generated on the basis of a line.

In the present working example, three set points are set. As such, connector 50 generates two lines, and a second image is to be generated for each of these two lines. Generator 60 thus generates two second images. With reference to FIG. 7B and FIG. 7C, the following more specifically describes a method performed by generator 60 of generating the second images. FIG. 7B and FIG. 7B are diagrams, each showing an example second image generated on the basis of a line. FIG. 7B shows a second image that is generated by rotating the first image by −φc°, on the basis of angle φc of line 7ccd that connects set points 6c and 6cd. The second image shown in FIG. 7B is an image in which line 7ccd coincides with the horizontal direction. Meanwhile, FIG. 7C shows a second image that is generated by rotating the first image by −φcd°, on the basis of angle φcd of line 7cdd that connects set points 6cd and 6d. The second image shown in FIG. 7C is an image in which line 7cdd coincides with the horizontal direction. Note that line 7ccd is, for example, a line segment that connects two set points 6c and 6cd, and line 7cdd is, for example, a line segment that connects two set points 6cd and 6d.

Working Example 3

The following describes an operation performed by measurement device 100 according to Working Example 3 of the present disclosure.

The operation performed by measurement device 100 according to the present working example is the same as those of Working Example 1 and Working Example 2 other than the operation of first setter 40. More specifically, the operation performed by measurement device 100 according to the present working example is the same as that of Working Example 2 other than the method of setting set points (representative point).

Figure 8:
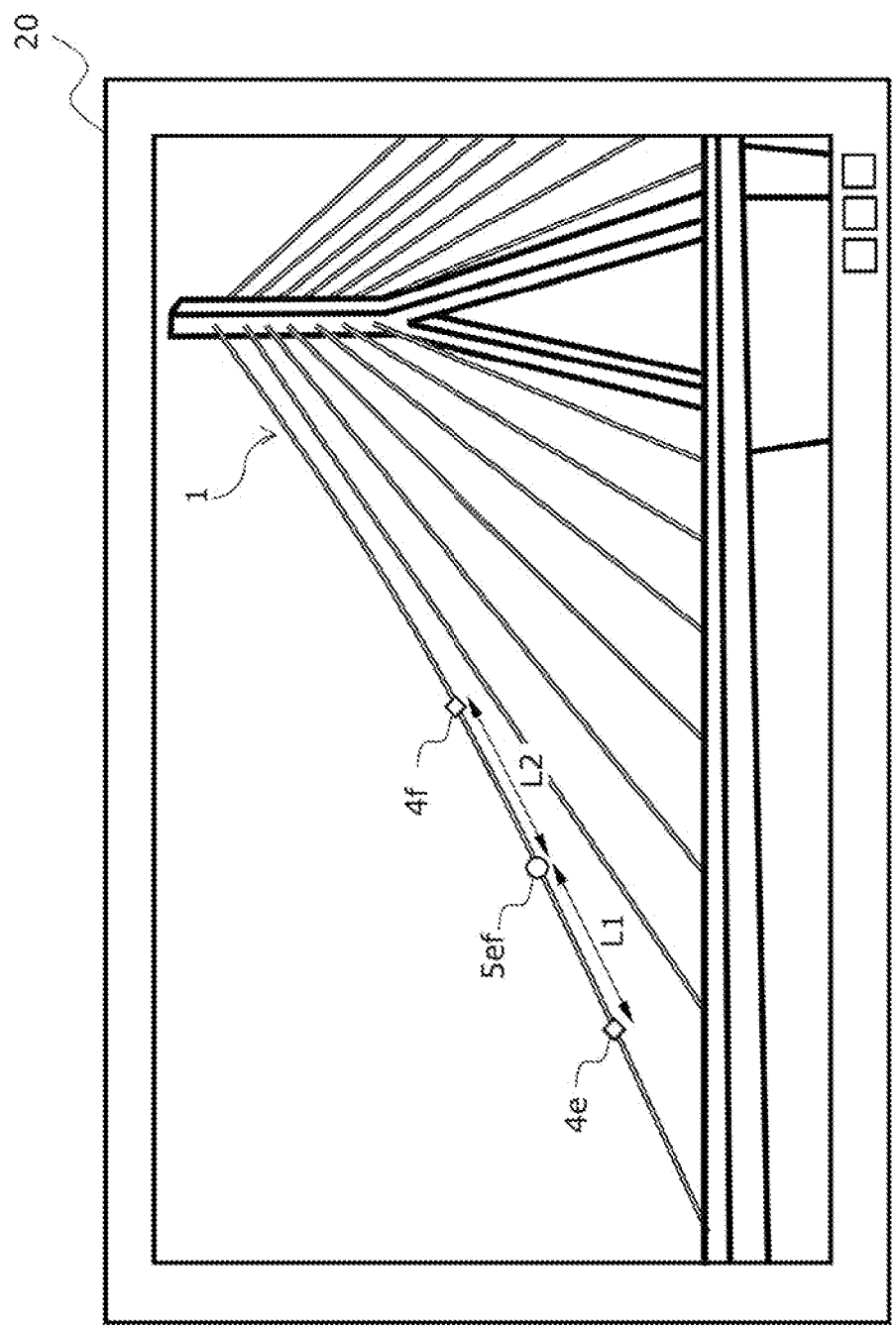
FIG. 8 is a diagram showing an example of corresponding points that are set on the basis of at least two points designated by the user in the first image and a representative point that is set on the basis of corresponding points.

FIG. 8 is a diagram showing an example of corresponding points that are set on the basis of the at least two designation points designated by the user in the first image, and a representative point that is set on the basis of the corresponding points. In the present working example, as shown in FIG. 8, first setter 40 sets at least two corresponding points 4e and 4f in the first image, and sets a plurality of set points including corresponding points 4e and 4f and at least one representative point (first setting step S40).

With reference to FIG. 8, the following more specifically describes a method of setting the set points. As shown in FIG. 8, first setter 40 sets at least one representative point on the basis of the at least two corresponding points that are set in the first image. More specifically, first setter 40 obtains, for example, two corresponding points 4e and 4f, and sets representative point 5ef that is different from two corresponding points 4e and 4f, on the basis of two corresponding points 4e and 4f obtained. In so doing, first setter 40 sets representative point 5ef at a position that is between two corresponding points 4e and 4f, i.e., in between two corresponding points 4e and 4f on target object 1. Even more specifically, first setter 40 detects an edge of that portion on target object 1 which is between corresponding points 4e and 4f, and sets representative point 5ef in a position at which distance L1 from corresponding point 4e and distance L2 from corresponding point 4f are the same. As described above, first setter 40 may set representative point 5ef at a position from which distance L1 and distance L2 to the respective two adjacent points among a plurality of set points 4e, 4f, and 5ef are constant at the edge of target object 1 or in proximity to the edge. First setter 40 sets three points of corresponding points 4e, 4f, and representative point 5ef as set points.

Note that the description of FIG. 8 provides a non-limited example of setting representative point 5ef on target object 1 whose portion between two corresponding points 4e and 4f is divided into two equal parts. Representative points may thus be set on target object 1 whose portion between two corresponding points 4e and 4f is divided into three or more equal parts. In this case, the number of representative points to be set is equal to the value obtained by subtracting 1 from the number of parts into which the foregoing portion of target object 1 is divided. The number of parts into which the foregoing portion of target object 1 is to be divided may be previously specified by the user, or may be set by first setter 40.

Working Example 4

The following describes an operation performed by measurement device 100 according to Working Example 4 of the present disclosure.

The operation performed by measurement device 100 according to the present working example is the same as those of Working Example 1 through Working Example 3 other than the operations of receiver 30 and first setter 40.

In the present working example, receiver 30 receives designation of one designation point in the first image displayed by display 20 in displaying step S20 (receiving step S30). Receiver 30 outputs one designation point 2g designated to first setter 40. As shown in FIG. 5, when one designation point 2g is designated in the first image, receiver 30 outputs, to first setter 40, information on the position, etc. of designation point 2g.

Subsequently, first setter 40 sets a corresponding point in the first image, on the basis of one designation point 2g designated, and further sets a set point from the corresponding point (first setting step S40).

Figure 9:
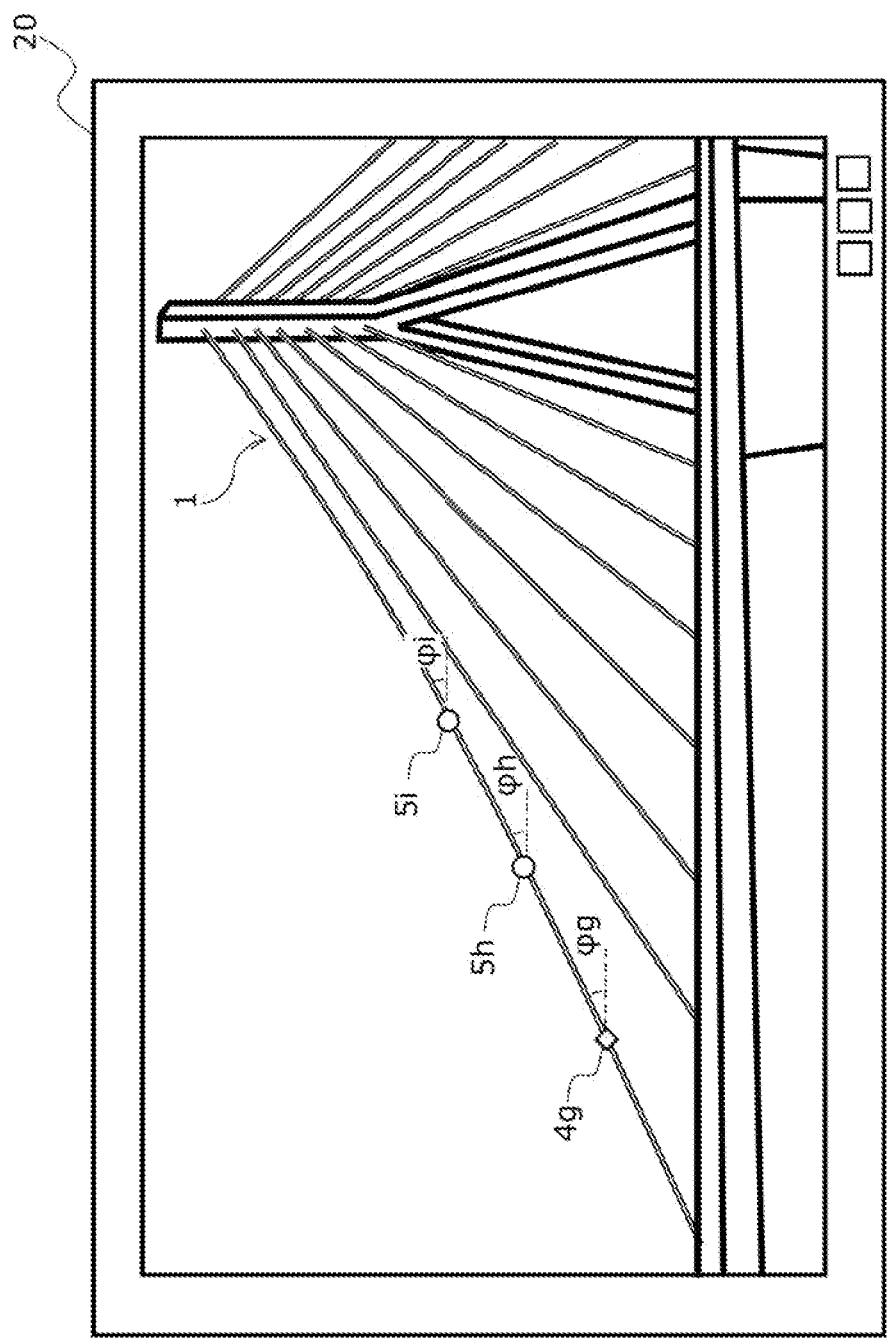
FIG. 9 is a diagram showing an example corresponding point that is set on the basis of one point designated by the user in the first image and a representative point that is set on the basis of the corresponding point.

With reference to FIG. 9, the following more specifically describes a method of setting the corresponding point. FIG. 9 is a diagram showing an example of the corresponding point that is set on the basis of the one point designated by the user in the first image, and a representative point that is set on the basis of the corresponding point. As shown in FIG. 9, first setter 40 sets the designation point in the first image as it is as a corresponding point, on the basis of the operation information of the user received by receiver 30 in receiving step S30 (here, the operation information is the information on the position, etc. of one designation point 2g designated by the user). More specifically, first setter 40 obtains, for example, one designation point 2g designated by the user, and sets such one designation point 2g as it is as corresponding point 4g, on the basis of one designation point 2g obtained. Here, the number of designation points and the number of corresponding points are the same. Subsequently, first setter 40 sets, on the first image, a plurality of set points that include one corresponding point 4g and at least one representative point.

As shown in FIG. 9, first setter 40 sets at least one representative point on the basis of one corresponding point set in the first image. More specifically, first setter 40 obtains, for example, one corresponding point 4g, and sets two representative points 5h and 5i that are different from one corresponding point 4g, on the basis of one corresponding point 4g obtained. In so doing, first setter 40 sets the representative points at positions on target object 1 that are based on corresponding point 4g and different from the position of corresponding point 4g. More specifically, first setter 40 detects that edge of target object 1 which is closest to corresponding point 4g, on the basis of corresponding point 4g, and sets representative points 5h and 5i at one side of corresponding point 4g on the detected edge. Representative point 5h is set at a position, on the edge of target object 1 which is detected on the basis of corresponding point 4g, at which a difference between angle φh of the tangential line of target object 1 at representative point 5h and angle φg of the tangential line of target object 1 at corresponding point 4g is greater than or equal to a predetermined value. Note that the tangential line of target object 1 is a tangential line at the detected edge.

Further, on the basis of representative point 5h, representative point 5i is set at a position, on that edge of target object 1 which is detected at the position closest to representative point 5h, at which a difference between angle φi of the tangential line of target object 1 at representative point 5i and angle φh of the tangential line of target object 1 at representative point 5h is greater than or equal to a predetermined value. Note that the tangential line of target object 1 is a tangential line at the detected edge. The predetermined value of the difference between the angles may be previously specified by the user or may be set by first setter 40. Also, the number of representative points to be set may be previously specified by the user, or may be set by first setter 40. First setter 40 sets three points of corresponding point 4g, and representative points 5h and 5i as set points.

Note that, in FIG. 9, both of the two representative points 5h and 5i are set on the right side of corresponding point 4g, but two representative points 5h and 5i may be set on the left side of corresponding point 4g or may be set in different directions with respect to corresponding point 4g (e.g., representative point 5h may be set on the left side, and representative point 5i may be set on the right side of corresponding point 4g). In this case, both of the two representative points are set on the basis of angle φg of the tangential line of target object 1 at corresponding point 4g.

Working Example 5

The following describes an operation performed by measurement device 100 according to Working Example 5 of the present disclosure.

The operation performed by measurement device 100 according to the present working example is the same as those of Working Example 1 through Working Example 4 other than the operations of receiver 30 and first setter 40.

In the present working example, receiver 30 receives designation of at least one external designation point, which is a designation point located outside of target object 1, in the first image displayed by display 20 in displaying step S20 (receiving step S30). Receiver 30 outputs, to first setter 40, external designation points 3j and 3k designated outside of target object 1.

Figure 10:
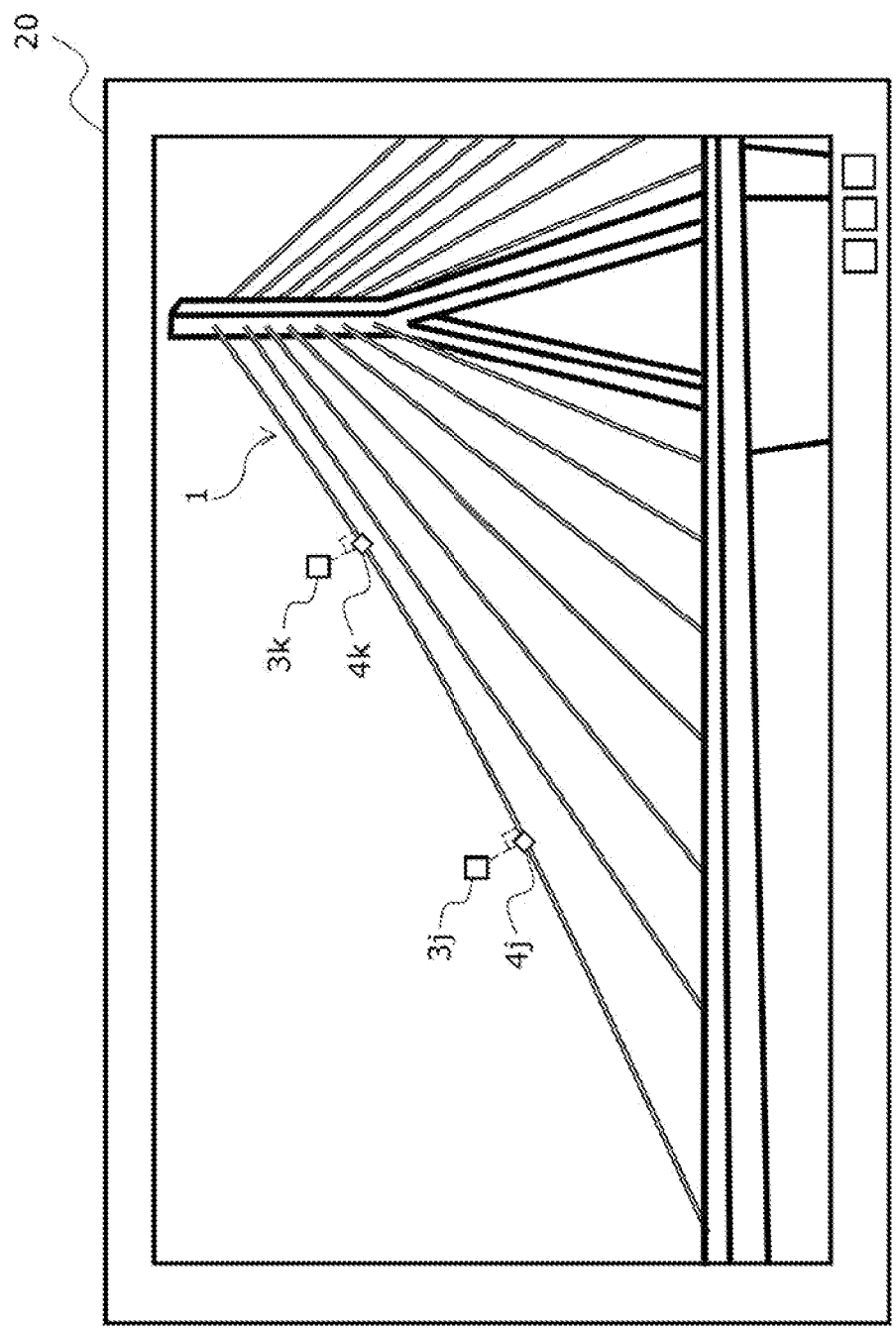
FIG. 10 is a diagram showing an example of at least one external designation point that is a designation point located outside of the target object and designated in the first image displayed on the display, and at least one corresponding point that is set on the basis of the at least one external designation point.

FIG. 10 is a diagram showing an example of at least one external designation point designated outside of the target object in the first image displayed on display 20 and, and at least one corresponding point that is set on the basis of such external designation point. As shown in FIG. 10, when external designation points 3*j* and 3*k* located outside of target object 1 are designated in the first image, receiver 30 outputs, to first setter 40, information on the positions, etc. of external designation points 3*j* and 3*k*. Here, FIG. 10 shows an example case where all of the designation points designated are external designation points that are located outside of target object 1, but a plurality of designation points including external designation points may be designated.

Subsequently, first setter 40 sets corresponding points in the first image on the basis of designation points 3*j* and 3*k* designated, and further sets set points from the corresponding points (first setting step S40). As shown in FIG. 10, first setter 40 sets the corresponding points on target object 1 in the first image, on the basis of the operation information of the user received by receiver 30 in receiving step S30 (here, the operation information is information on the positions, etc. of the two designation points 3*j* and 3*k* designated by the user). More specifically, first setter 40 obtains, for example, two designation points 3*j* and 3*k* designated by the user. On the basis of such two designation points 3*j* and 3*k* obtained, first setter 40 sets, as corresponding points 4*j* and 4*k*, two intersection points of target object 1 (edge of target object 1) and the two shortest vertical lines, among one or more vertical lines, that run through respective designation points 3*j* and 3*k* within an area that is closest to designation points 3*j* and 3*k*, among a plurality of areas in the first image that are identified as including target object 1. Stated differently, when external designation points, which are designation points not located on target object 1, are received in receiving step S30, first setter 40 sets, as corresponding points, the points that are closest to such external designation points in a region identified as including the target object in the first Image. Here, the number of designation points including designation points 3*j* and 3*k* is the same as the number of corresponding points that are set. Subsequently, first setter 40 sets a plurality of set points including corresponding points 4*j* and 4*k*.

The following describes a method of setting the set points. First setter 40 sets at least one corresponding point that is set earlier in the first image as it is as a set point. More specifically, first setter 40 obtains, for example, two corresponding points 4*j* and 4*k*, and sets these two corresponding points 4*j* and 4*k* as they are as two set points, on the basis of two corresponding points 4*j* and 4*k* obtained. Here, the set points may include the at least one corresponding point and a representative point, or may include two or more corresponding points.

Working Example 6

The following describes an operation performed by measurement device 100 according to Working Example 6 of the present disclosure.

The operation performed by measurement device 100 according to the present working example is the same as those of Working Example 1 through Working Example 5 other than the operation of generator 60.

Figure 11A:
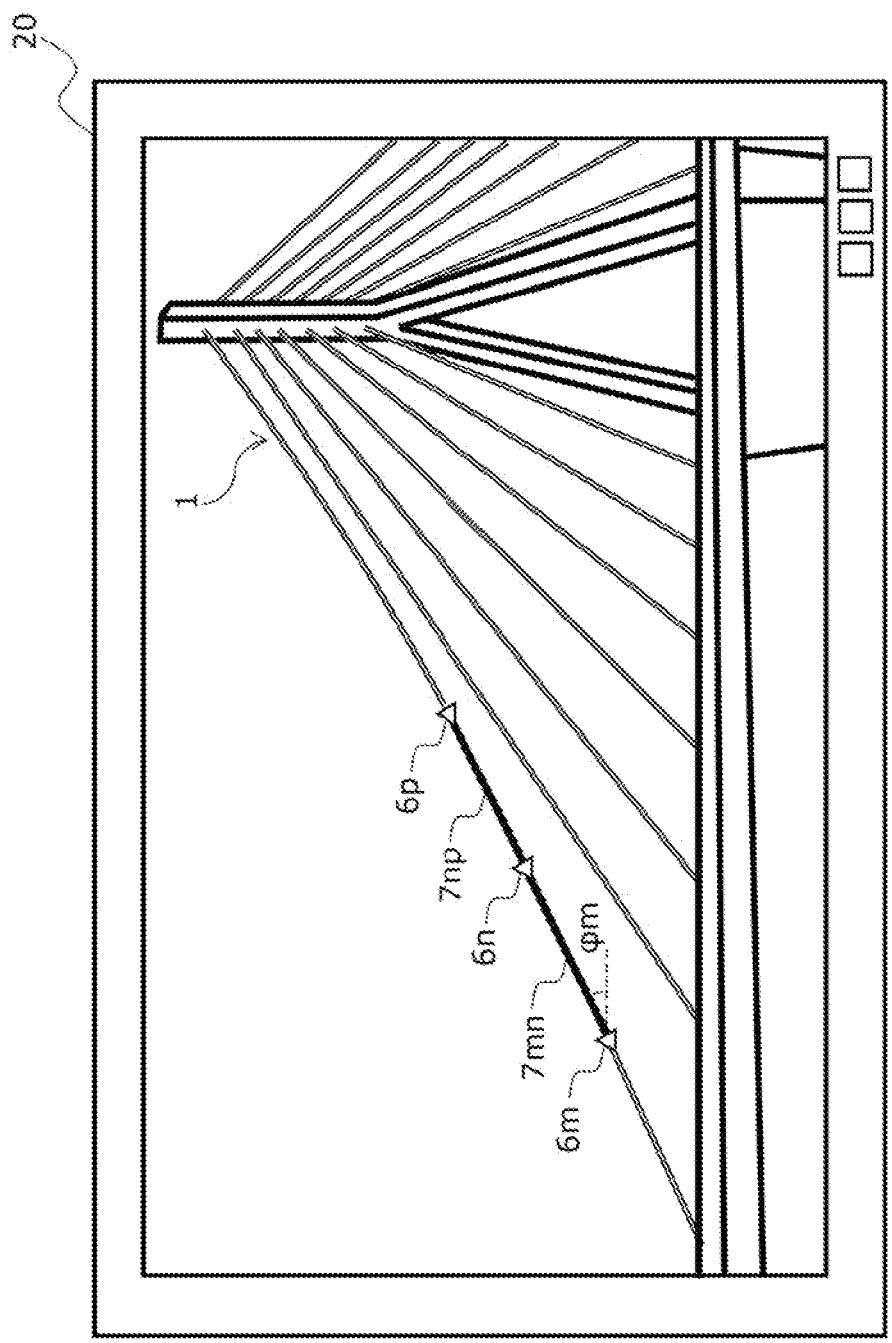
FIG. 11A is a diagram showing an example result of detecting an angle of a line that is set on the first image.

In the present working example, generator 60 generates a second image in which the line set by connector 50 is horizontal or vertical (generating step S60). With reference to FIG. 11A, the following more specifically describes a method of generating the second image. FIG. 11A is a diagram showing an example result of detecting an angle of a line that is set on the first image. As shown in FIG. 11A, generator 60 obtains lines and detects an angle of a representative line. For a more specific example, consider the case where line 7*mn* that connects set points 6*m* and 6*n* and line 7*np* that connects set points 6*n* and 6*p* have the same angle. Of these two lines 7*mn* and 7*np*, line 7*mn* is extracted as a representative line and angle ϕm of line 7*mn* is detected. Note that line 7*mn* is, for example, a line segment that connects two set points 6*m* and 6*n* and line 7*np* is, for example, a line segment that connects two set points 6*n* and 6*p*.

Figure 11B:
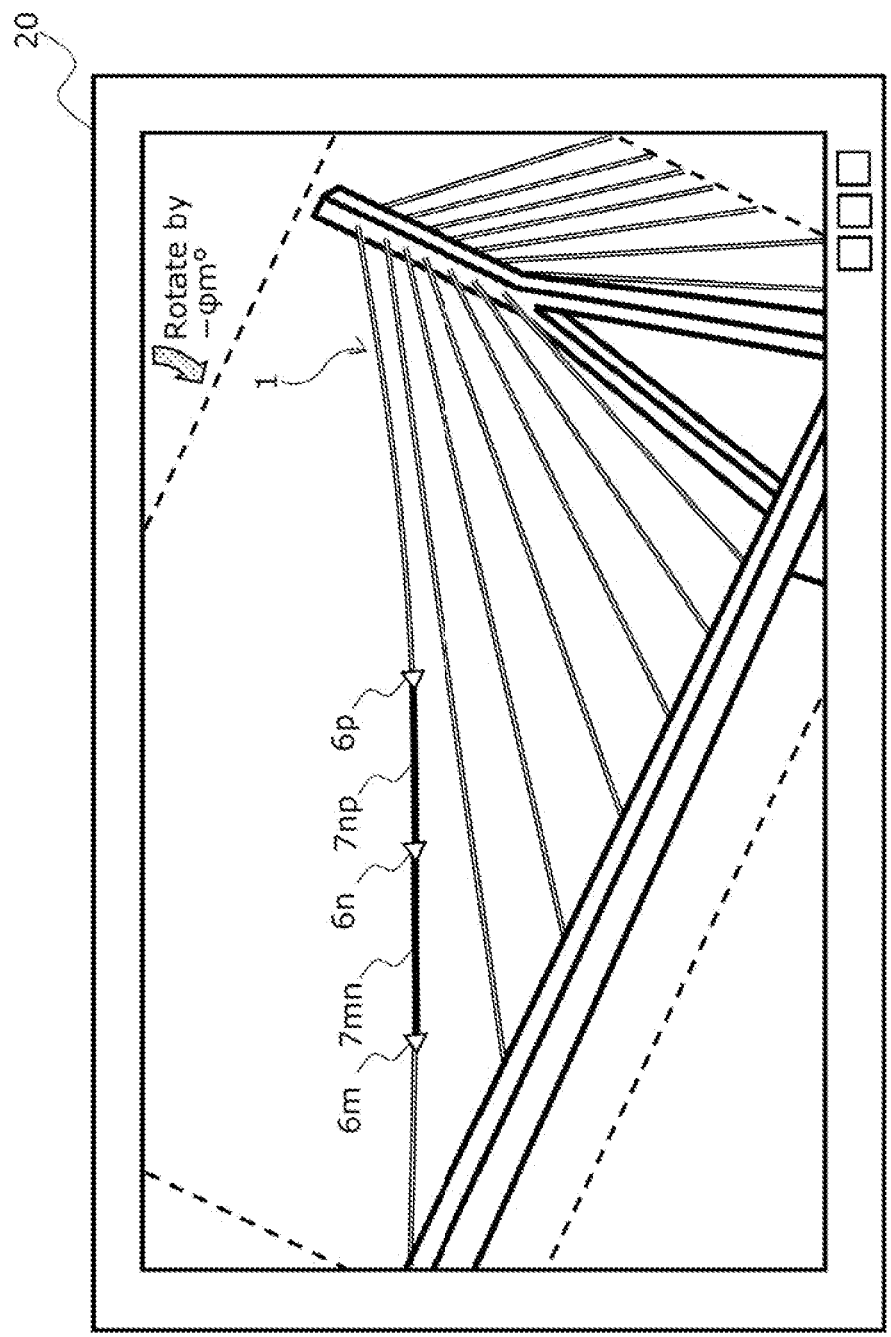
FIG. 11B is a diagram showing an example second image generated on the basis of the line.

FIG. 11B is a diagram showing an example second image generated on the basis of the line. As shown in FIG. 11B, the first image is rotated by −ϕm°, thereby generating a second image in which line 7*mn* is horizontal. Here, the first image may be rotated by (90−ϕm)° to generate a second image in which line 7*mn* is vertical. In FIG. 11A and FIG. 11B, one of a plurality of lines that have the same angle is extracted as a representative line, but a line that has an angle closest to the mean value of the angles of all lines can also be used as a representative line.

Working Example 7

The following describes an operation performed by measurement device 100 according to Working Example 7 of the present disclosure.

The operation performed by measurement device 100 according to the present working example is the same as those of Working Example 1 through Working Example 6 other than the operations of receiver 30 and second setter 70.

In the present working example, second setter 70 sets measurement regions that partially include a line, on the basis of the line in the second image (second setting step S70). With reference to FIG. 12, the following more specifically describes a method of setting the measurement regions. FIG. 12 is a diagram showing example measurement regions set by the second setter. As shown in FIG. 12, second setter 70 sets measurement regions, in the second image, that partially include the line. More specifically, second setter 70 obtains line 7*qr* that connects two set points 6*q* and 6*r*, and sets measurement regions 9*q* and 9*r* that include line 7*qr*, on the basis of line 7*qr* obtained. Here, the measurement regions are blocks having an area of a certain size, but the measurement regions may be points. Also, the number of measurement regions to be set may be previously specified by the user, or may be set by second setter 70. Further, all of the measurement regions to be eventually set may be set by second setter 70, or some of such measurement regions may be specified by the user. When the measurement regions include a measurement region that is set at the position of the measurement point designated by the user, second setter 70 obtains the operation information of the user received by receiver 30. Note that line 7*qr* is, for example, a line segment that connects two set points 6*q* and 6*r*.

Other Embodiments

The measurement method and the measurement device according to one or more aspects of the present disclosure have been described above on the basis of the embodiment, but the present disclosure is not limited to such embodiment. The scope of one or more aspects of the present disclosure may also include an embodiment achieved by making various modifications to the embodiment that can be conceived by those skilled in the art and an embodiment achieved by combining some of the elements in different embodiments, without departing from the essence of the present disclosure.

For example, in the measurement system according to the foregoing embodiment, an obtained image is rotated to generate a second image that is used to measure a displacement, but the measurement system according to the present disclosure may be configured to perform imaging by imaging device 200 that is rotated beforehand. With this, it is possible to obtain a moving image that is captured at a rotated angle. This eliminates the necessity to perform image processing such as image rotation, thus achieving a measurement device that requires a smaller amount of computation.

For example, measurement device 100 according to the foregoing embodiment includes display 20, but may be configured without display 20. In this case, measurement device 100 causes an external display device connected to measurement device 100 to display images, etc. Stated differently, measurement device 100 may be configured to output, to the external display device, a signal for displaying a user interface (UI) for receiving an input onto a first image and/or a second image, a measurement result, etc.

For example, measurement device 100 according to the foregoing embodiment may be configured without connector 50. Stated differently, a line does not necessarily have to be generated by connector 50. In this case, generator 60 identifies the direction of a line that connects two of a plurality of set points, and rotates a first Image to generate a second image in which such identified direction is horizontal or vertical. Stated differently, the direction of a line that connects two set points is simply required to be identified, meaning that line generation is not necessary.

For example, in the measurement system according to the foregoing embodiment, measurer 80 measures, in each of at least one measurement region, a displacement of target object 1 in a direction that is orthogonal to the line on target object 1, that is, a displacement of target object 1 only in one of the horizontal direction and the vertical direction of a second image. However, the present disclosure is not limited to this. Measurer 80 may thus measure a displacement of target object 1, in a measurement region, in each of the horizontal direction and the vertical direction of the second image and output the measurement result on only one of the horizontal direction and the vertical direction (i.e., the direction corresponding to the direction that is orthogonal to the line on target object 1). Also in this case, the measurement system is capable of reducing the process of integrating the measurement results on the horizontal direction and the vertical direction.

Also, one or more, or all of the elements included in the measurement device according to the foregoing embodiment may be implemented by, for example, a single system large scale integration (LSI).

A system LSI is a super multi-function LSI that is manufactured by integrating a plurality of elements on a single chip. More specifically, a system LSI is a computer system that includes a microprocessor, a read only memory (ROM), a random access memory (RAM), and so forth. The ROM stores a computer program. The microprocessor operates in accordance with such computer program, thereby enabling the system LSI to accomplish its functions.

Although a system LSI is described here as an example, a chip on which a plurality of elements are integrated can be also referred to as an integrated circuit (IC), an LSI, a super LSI, or an ultra LSI, depending on the degree of integration. Also, a technique of circuit integration is not limited to the implementation as an LSI. Each of the elements thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Furthermore, when a new IC technology that replaces LSIs is available as a result of the future progress in a semiconductor technology or other derivative technologies, such new technology may of course be employed to integrate the functional blocks. For example, application of biotechnology, etc. is possible.

Note that an aspect of the present disclosure may be implemented not only as the foregoing measurement device, but also as a measurement method that includes, as its steps, the characteristic elements included in the measurement device. An aspect of the present disclosure may be implemented also as a computer program that causes a computer to execute these characteristic steps included in the measurement method. An aspect of the present disclosure may also be a non-transitory, computer-readable recording medium that stores such computer program.

Each of the elements in the foregoing embodiment may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory. Here, the software program for realizing the measurement device and so forth according to the foregoing embodiment is a program described below.

INDUSTRIAL APPLICABILITY

The present disclosure is widely applicable to a measurement method and a measurement device for measuring a displacement of a target object. The present disclosure is applicable, for example, to a method of inspecting the durability and safety of an infrastructural structure such as a cable-stayed bridge.

The invention claimed is:

1. A measurement method performed by a measurement device that measures a displacement of a linear-shaped target object, the measurement method comprising:
    obtaining a first image that includes the linear-shaped target object;
    causing a display to display the first image;
    receiving designation of a designation point on the first image displayed;
    setting a plurality of set points on the linear-shaped target object in a longitudinal direction, based on the designation point;
    identifying a direction of a line that connects two of the plurality of set points;
    generating and causing the display to display a second image by rotating the first image, the second image being an image in which the direction of the line is horizontal or vertical;
    setting, in the second image displayed, a measurement region that partially includes the line; and
    measuring a displacement of the linear-shaped target object in the measurement region, the displacement being based on a displacement of the linear shaped target object in a direction orthogonal to the line in the measurement region,
    wherein the displacement is an amount of spatial change in a direction or a distance of the linear-shaped target with respect to the line in the measurement region.

2. The measurement method according to claim 1,
wherein in the generating of the second image, the second image is generated for each of a plurality of lines to obtain a plurality of second images, the plurality of lines each being the line, and
the measuring includes measuring the displacement of the linear-shaped target object in the measurement region in each of the plurality of second images generated, the displacement being a displacement in the direction orthogonal to the line.

3. The measurement method according to claim 1,
wherein the plurality of set points include at least one corresponding point, or the at least one corresponding point and at least one representative point,
the at least one corresponding point is a point that is set on an edge of the linear-shaped target object or in proximity to the edge, based on the designation point, and
the at least one representative point is a point that is set on the edge of the linear-shaped target object or in proximity to the edge, based on the at least one corresponding point.

4. The measurement method according to claim 3,
wherein when the at least one corresponding point comprises a single corresponding point, the at least one representative point is set on the linear-shaped target object, based on the single corresponding point.

5. The measurement method according to claim 3,
wherein when the at least one corresponding point comprises two or more corresponding points, the at least one representative point is set in a portion on the linear-shaped target object, the portion being a portion between the two or more corresponding points.

6. The measurement method according to claim 3,
wherein the at least one representative point that is set adjacent to the at least one corresponding point is set at a position in which an angular difference is greater than or equal to a predetermined value, the angular difference being a difference between an angle in a tangential direction of the linear-shaped target object at the at least one representative point and an angle in the tangential direction of the linear-shaped target object at the at least one corresponding point.

7. The measurement method according to claim 3,
wherein a first representative point among the at least one representative point is set at a position in which an angular difference is greater than or equal to a predetermined value, the angular difference being a difference between an angle in a tangential direction of the linear-shaped target object at the first representative point and an angle in the tangential direction at a second representative point that is a representative point different from the first representative point among the at least one representative point, the second representative point being already set and adjacent to the first representative point.

8. The measurement method according to claim 3,
wherein the at least one representative point is set at a position from which respective distances to adjacent two of the plurality of set points are equal on the edge of the linear-shaped target object or in proximity to the edge.

9. The measurement method according to claim 3,
wherein the at least one corresponding point is the designation point.

10. The measurement method according to claim 3,
wherein when an external designation point that is a designation point located outside of the linear-shaped target object is received in the receiving, the setting of the plurality of set points includes setting, as the at least one corresponding point, a point that is closest to the external designation point in a region in the first image, the region being identified as including the linear-shaped target object.

11. The measurement method according to claim 1,
wherein the setting of the measurement region includes receiving designation on the linear-shaped target object in the second image, and setting, as the measurement region, a region that is based on the designation received on the second image.

12. The measurement method according to claim 1,
wherein the setting of the measurement region includes identifying an edge of the linear-shaped target object in the second image, and setting, as the measurement region, a region that is based on the edge identified.

13. The measurement method according to claim 2,
wherein the measuring includes measuring at least one of a frequency or an amplitude of a movement of the linear-shaped target object from the displacement of the linear-shaped target object in each of a plurality of directions that are orthogonal to the plurality of lines.

14. A measurement method performed by a measurement device that measures a displacement of a linear-shaped target object, the measurement method comprising:
obtaining a first image that includes the linear-shaped target object, the first image having a horizontal direction and a vertical direction;
causing a display to display the first image;
receiving designation of a designation point on the first image displayed;
identifying a direction of the linear-shaped target object on the first image, based on the designation point;
generating and causing the display to display a second image by rotating the first image to cause the direction to be aligned with a first direction that is approximately aligned with the horizontal direction or the vertical direction of the first image;
setting a measurement region, in the second image displayed, that partially includes the linear-shaped target object; and
measuring a displacement of the linear-shaped target object in the measurement region, the displacement being based on a displacement of the linear-shaped target object in a second direction that is orthogonal to the first direction in the measurement region,
wherein the displacement is an amount of spatial change in a direction and a distance of the linear-shaped target with respect to the line in the measurement region.

15. The measurement method according to claim 14, further comprising:
setting a plurality of set points on the linear-shaped target object, based on the designation point; and
identifying a line that extends in the direction and connects two of the plurality of set points.

16. The measurement method according to claim 1,
wherein the linear-shaped target object is an object whose edge has an angle at least partially relative to a horizontal direction or a vertical direction of the first image.

17. A measurement device comprising: a non-transitory memory configured to store a program; and a hardware processor configured to execute the program and control the measurement device to:

obtain a first image that includes a linear-shaped target object;
output and display the first image;
receive designation of a designation point on the first image displayed;
set a plurality of set points on the linear-shaped target object in a longitudinal direction, based on the designation point;
identify a direction of a line that connects two of the plurality of set points, and generate and cause the display to display a second image by rotating the first image, the second image being an image in which the direction is horizontal or vertical;
set a measurement region, in the second image displayed, that partially includes the line;
and measure a displacement of the linear-shaped target object in the measurement region, the displacement being based on a displacement of the linear-shaped target object in a direction that is orthogonal to the line in the measurement region, wherein the displacement is an amount of spatial change in a direction and a distance of the linear-shaped target with respect to the line in the measurement region.

* * * * *